US010432983B2

(12) United States Patent
Koumchatzky et al.

(10) Patent No.: US 10,432,983 B2
(45) Date of Patent: Oct. 1, 2019

(54) LIVE VIDEO CLASSIFICATION AND PREVIEW SELECTION

(71) Applicant: Twitter, Inc., San Francisco, CA (US)

(72) Inventors: Nicolas Koumchatzky, San Francisco, CA (US); Kevin Quennesson, San Francisco, CA (US); Louis-Alexandre Etezad-Heydari, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/479,225

(22) Filed: Apr. 4, 2017

(65) Prior Publication Data

US 2017/0289589 A1    Oct. 5, 2017

Related U.S. Application Data

(60) Provisional application No. 62/318,198, filed on Apr. 4, 2016, provisional application No. 62/318,736, filed on Apr. 5, 2016.

(51) Int. Cl.
*H04N 7/173* (2011.01)
*H04N 21/234* (2011.01)
(Continued)

(52) U.S. Cl.
CPC ... *H04N 21/23418* (2013.01); *H04N 21/2187* (2013.01); *H04N 21/2541* (2013.01); *H04N 21/4627* (2013.01); *H04N 21/4828* (2013.01)

(58) Field of Classification Search
CPC ......... H04N 21/23418; H04N 21/2343; H04N 21/439; H04N 21/44008; H04N 21/8352
(Continued)

(56) References Cited

U.S. PATENT DOCUMENTS 8,311,950 B1 * 11/2012 Kunal ............... G06Q 30/0201
705/319
8,452,778 B1 * 5/2013 Song ................. G06K 9/00711
704/233

(Continued)

FOREIGN PATENT DOCUMENTS

WO    2011/009101 A1    1/2011

OTHER PUBLICATIONS

Mei, et al., "Contextual Video Recommendation by Multimodal Relevance and User Feedback", ACM Transactions on Information Systems, vol. 29, No. 2, Article 10, Apr. 2011, 24 pages.

(Continued)

*Primary Examiner* — Jivka A Rabovianski
(74) *Attorney, Agent, or Firm* — Brake Hughes Bellermann LLP

(57) ABSTRACT

Systems and methods select and provide video snippets in a matrix interface. Example methods include obtaining a portion of a live video stream, assigning the portion to a class, determining that the portion is preview-eligible, and generating a snippet of the live video stream using the portion. Other example methods include determining, using a trained video classifier, a set of live broadcasts that have at least one portion that is classified as preview-eligible, calculating, for each of the live broadcasts in the set, an aggregate score for the live broadcast, selecting live broadcasts with highest aggregate scores, generating a snippet for each of the selected live broadcasts, and providing the snippets in a user interface. Methods may also include selecting portions of live video streams that are responsive to a user-provided parameter and generating a snippet for each live video stream that has a preview-eligible portion.

20 Claims, 13 Drawing Sheets

(51) Int. Cl.
*H04N 21/2187* (2011.01)
*H04N 21/482* (2011.01)
*H04N 21/254* (2011.01)
*H04N 21/4627* (2011.01)

(58) Field of Classification Search
USPC .............................................. 725/116, 19, 26
See application file for complete search history.

(56) References Cited

U.S. PATENT DOCUMENTS

| | | | |
|---|---|---|---|
| 9,361,377 B1* | 6/2016 | Azari | G06F 17/30029 |
| 2012/0039539 A1* | 2/2012 | Boiman | G11B 27/28 |
| | | | 382/195 |
| 2012/0059825 A1 | 3/2012 | Fishman et al. | |
| 2012/0089681 A1 | 4/2012 | Chowdhury et al. | |
| 2013/0007787 A1 | 1/2013 | John et al. | |
| 2013/0080159 A1 | 3/2013 | Sharifi et al. | |
| 2013/0105743 A1 | 5/2013 | Owen et al. | |
| 2013/0167168 A1 | 6/2013 | Ellis et al. | |
| 2014/0278308 A1 | 9/2014 | Liu et al. | |
| 2015/0095329 A1 | 4/2015 | Sanio et al. | |
| 2015/0363635 A1* | 12/2015 | Suri | G06K 9/00268 |
| | | | 386/241 |
| 2015/0365725 A1 | 12/2015 | Belyaev et al. | |
| 2016/0105734 A1 | 4/2016 | Packard et al. | |

OTHER PUBLICATIONS

Mittal, et al., "Automatic Content-Based Retrieval and Semantic Classification of Video Content", International Journal on Digital Libraries, vol. 6, No. 1, Feb. 2006, pp. 30-38.

International Search Report and Written Opinion for PCT Patent Application No. PCT/US2017/026014, dated Jun. 26, 2017, 14 Pages.

Brezeale, et al., "Automatic Video Classification: A Survey of the Literature", IEEE Transactions on Systems, Man, and Cybernetics, vol. 38, Issue 3, May 2008, 16 pages.

Gauch, et al., "Real Time Video Scene Detection and Classification", Information Processing and Management 35, 1999, pp. 381-400.

* cited by examiner

500

| | |
|---|---|
| Total | 100 |
| Hide.Selfie | 56.62 |
| Hide.Noise | 8.4 |
| Hide.Noise.Dark | 7.93 |
| Hide.Noise.Indoor | 5.96 |
| Hide.Screen | 4.98 |
| Hide.Driving | 4.63 |
| Hide.NSFW.risky | 3.14 |
| Show.Talk | 1.31 |
| Show.Stage | 1.07 |
| Hide.Porn | 0.93 |
| Hide.Children | 0.83 |
| Show.Food | 0.68 |
| Show.Sport | 0.66 |
| Show.Urban | 0.81 |
| Show.Outdoor | 0.59 |
| Show.Animal | 0.54 |
| Show.Unplugged | 0.53 |
| Show.Live | 0.25 |
| Hide.Text | 0.22 |
| Show.Art | 0.14 |

FIG. 8

LIVE VIDEO CLASSIFICATION AND PREVIEW SELECTION

RELATED APPLICATION

This application is a non-provisional of, and claims priority to U.S. Provisional Application No. 62/318,736, filed Apr. 5, 2016, titled "LIVE VIDEO CLASSIFICATION AND PREVIEW SELECTION and to U.S. Provisional Application No. 62/318,198, filed Apr. 4, 2016, titled "Video Understanding,", the disclosures of which are incorporated herein by reference.

BACKGROUND

Social media has become a growing part of social life. Social media users can post blogs, photos, comments, messages, locations, feelings, and videos using one or more social media platforms. Some social media includes live video streams, which can be captured from a mobile device and broadcasted to viewers selected via a social graph. Optionally, the streams can be searchable and viewable by any member of or anyone else having access to the social media platform.

SUMMARY

Techniques, methods, and systems are disclosed herein for helping a user find interesting video broadcasts (either live or rebroadcasts). In some implementations, the video broadcasts may be accessible on a live video sharing platform, e.g., available as part of a social media platform. Given the massive number of streams available for viewing on many such platforms, an effective information retrieval system provides snippets of prospective broadcasts of interest so the user can preview them before committing time to watch the entirety of or at least a significant portion of the broadcasts. Snippets are also referred to as previews. Randomly selecting which segment of a broadcast to include in the snippet yields snippets that are frequently not representative of the content of the broadcast. For example, social media broadcasts tend to be content noisy as they are unedited and show things that are not interesting to viewers so selection of a random portion may be uninformative. (For example, a broadcast of a live concert may include segments that preceded the concert, segments in which the broadcaster dropped her phone, or segments in which the broadcaster misdirected her phone camera to the ground.)

Implementations find the segment or segments of the broadcast most relevant to the content attributed to the broadcast, which the system achieves by assessing the frequency of occurrence of a class over all accessible broadcasts and the frequency of occurrence of the class in a particular broadcast. Classes that occur frequently over the accessible broadcasts of the platform are more likely to be noise and less likely to be of interest to viewers and hence excluded from inclusion in a snippet. These classes represent the figurative ANDS and THEs, e.g., stop words, of search terms, which terms occur in almost every searchable text document. For video broadcasts, segments showing selfies, for example, tend to be noise as they occur very frequently, e.g., well over 55% of all accessible broadcasts. Classes that do not occur frequently, e.g., less than 1% of all accessible broadcasts, tend to be more likely to be of interest to viewers. These classes include, e.g., sports and food. By comparing the ratio of the frequency of occurrence in a particular broadcast and the frequency of occurrence over all accessible broadcasts (or a representative sample thereof), the system selects with high accuracy which segments of a broadcast to include in a snippet for the broadcast so that the snippet is representative of content shown in the broadcast.

In some implementations, the system obtains a sample of all broadcasts available on the platform and classifies them according to classes. The classes can correlate to classes of available content classifiers that are supervised, i.e., machine learning models that are trained under some degree of human supervision. In some implementations, the system may train a classifier that is unsupervised using metadata for stored broadcasts, i.e., broadcasts that were live video streams and are stored for a period of time. A broadcast may include different content and hence may be classified under multiple classes of content. For example, a broadcast may include a sporting event and food available at the sport venue and hence would likely be classified as having content related to sports and also content related to food. Moreover, the sample size should be sufficiently large to be representative of content shown in all accessible broadcasts at the time of sampling.

For the sample obtained, the system determines which content are popular among the broadcasts sampled and which content are rare. For a particular class, the determination is based on the number of broadcasts sampled that show content classified under the particular class. The system calculates the percentage of the sample broadcasts that show the particular class, which percentage is a proxy measure of the frequency of occurrence of the particular class over all accessible broadcasts. FIG. 8 shows an example of content classes and the respective percentages of their occurrence over the broadcasts sampled.

Based on the calculated popularity and rarity of classes, the system formulates weighting metrics to either repress or promote each class. FIG. 9A shows an example of the repressed classes of Selfie and Noise and FIG. 9B shows an example of the promoted classes of Unplugged, Food, Outdoor, Sport, etc. In FIG. 8 repressed classes are indicated as "hide" and promoted classes are indicated as "show," respectively.

For a broadcast for which a snippet is to be generated, the system segments the broadcast, e.g., into 3 second segments, and programmatically classifies each segment. A broadcast can have, e.g., 4 of its segments classified as Selfie, 8 as Indoor, 125 as Sport, and 150 as Food, etc. The system assigns a measure of confidence in its classification of each segment. In some implementations, the broadcast may be segmented as part of the streaming process, e.g., an HTTP Live Stream Protocol (HLS) or similar process.

Optionally, the system predicts a level of interest for the broadcast by calculating an aggregate score based on the above segment classification (number of segments for each class detected, the respective measures of confidence, and whether to repress or promote) and the respective percentages of occurrence of detected content classes over the sampled broadcasts. A score meeting thresholds validated by training data indicates the broadcasts as having content of interest, and the system designates the broadcast as such.

In some implementations, the system selects the promoted segments of the broadcast, e.g., those classified as "Show," for snippets. The system may select the segment with the highest confidence level as the base segment and generate a snippet around the base segment. In some implementations, the system may generate a snipped for each "Show" class detected in the broadcast. For example, the broadcast may have a snippet for Sports and one for Food. In some implementations the system selects which snippet to provide in response to a query based on the query terms. The system may select, for example, the food snippet in response to queries having terms suggesting an interest in food.

Alternatively, the system generates just one snippet for the broadcast. In some implementations the system loops through the snippets for each promoted class, the snippet for each class including segments stitched around a segment having the highest confidence level for that class.

In some implementations, the system uses trained classifiers to identify broadcasts and previews of those broadcasts to show to users. The broadcasts selected for preview may be personalized. Implementations are not limited to searching and generating snippets for live broadcasts, but also work for identifying previously recorded video, such as broadcasts that have ended and are available for replay as well as pre-recorded video files that are not live-streams.

BRIEF DESCRIPTION OF DRAWINGS

FIG. 8 is an example of class proportion data, according to an implementation.

Like reference symbols in the various drawings indicate like elements.

DETAILED DESCRIPTION

Techniques are disclosed herein for using video classifiers to identify live video broadcasts that are public and considered preview-eligible. Live video broadcasts are preview-eligible when they are categorized in a class that the system has identified as uncommon or interesting, or has flagged as eligible for preview. The system may classify small portions of the live video broadcast (e.g., 3 seconds). Classification may occur on that portion of the video, but may be done repeatedly while the broadcast remains live. Of the live video broadcasts that are preview-eligible, the system may calculate an aggregated score for each broadcast portion, further determine those broadcasts that meet either personalized or general parameters, and display a short preview of the most highly ranked live broadcast portions that meet the parameters. A preview for a particular broadcast may be automatically selected using a highest scoring portion of the broadcast as a center portion of the preview. For example, the preview may be 15 second long, with a highest scoring 3 second portion in the middle of the 15 second preview. Alternatively, the system may stitch together the highest scoring portions of a video. Although described with regard to live video broadcasts, the disclosed methods and techniques also classify and select snippets of recorded video files (e.g., any video played from a storage media).

Figure 1:
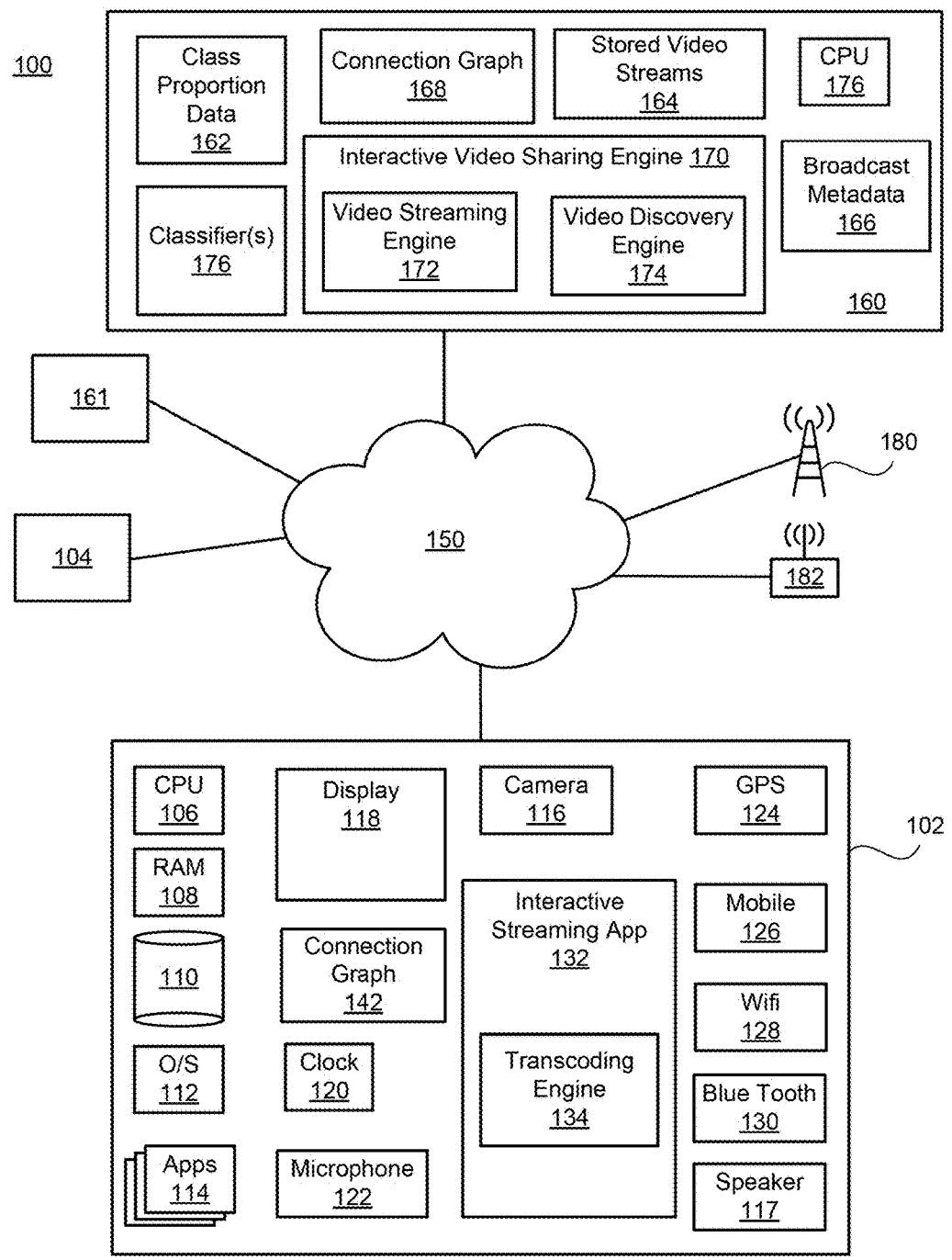
FIG. 1 is a schematic diagram of a system supporting live video classification and preview selection, according to an implementation.

FIG. 1 is a schematic diagram of a system 100 for identifying and displaying live video broadcast previews. System 100 can thus include one or more client device(s) 102, 104 connected to one or more server computers 160, 161 through one or more networks 150. The client devices are consumer computing devices and can be a mobile computing device (e.g., a smart phone, a PDA, a tablet, a wearable device, such as a wrist or head mounted device, a virtual reality device, or a laptop computer) or a non-mobile personal computing device (e.g., a desktop computing device, internet-enabled television or entertainment system). The client device 102 can include one or more processors 106 (e.g., a processor formed in a substrate, such as a central processing unit, a graphics processor, etc.), a volatile memory 108, and nonvolatile memory 110. In various implementations, the volatile memory 108 may store, for example, instructions that are executed by the processor(s) 106, and the nonvolatile memory 110 may store, for example, various user data, instructions for executing an operating system, applications, etc. While FIG. 1 illustrates client device 102 in more detail than client device(s) 104, it is understood that client device(s) 104 include similar components.

The computing device 102 can include an operating system 112 and a plurality of applications 114, which can be executed by the computing device 102 (e.g., by the processor 106 executing one or more instructions stored in memory 108 or 110 that correspond to the application) and which may communicate with the operating system (e.g., through one or more application programming interfaces (APIs)). Execution of the applications 114 can provide various functionalities to a user of the computing device 102. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application. A camera application can provide access to a camera 116 within the computing device 102 for capturing still pictures or video. In some implementations, the camera 116 may be external to the computing device 102, such as a camera that communicates wirelessly, e.g., via BLUETOOTH or Wi-Fi, with the computing device 102. Applications that provide a rich variety of other functionalities and information to the user also can be provided. In some implementations, the interactive streaming application 132 may be considered one of the applications 114.

The computing device 102 includes a display 118 (e.g., a touchscreen display, an LED display, etc.) that can display a user interface for an application 114 that is being executed by the device. More than one application 114 can be executed at a time. However, in some implementations (e.g., in the case of a smart phone), the size of the display is better suited for a single executing application 114 to be displayed at a time. The executing application 114 that is displayed on the display 118 can be referred to as a "front-facing" application.

The computing device 102 can include internal speakers 117 that can provide an audio output from the device. The computing device 102 also can include a port (not shown) that can be used to connect the computing device to external devices, e.g., speakers that may provide an audio output when connected to the device 102. The computing device 102 may also include a microphone 122 that detects sound in the environment of the device. In some implementations, the microphone 122 may be external to the computing device 102. The microphone 122, whether internal or external, may provide audio for a live video stream.

The computing device also includes a clock 120 that determines a time and date and may include a GPS transceiver 124 that communicates with a global positioning system to determine a location of the computing device 102. The location may be provided as part of the metadata associated with a real-time video stream. The computing device 102 also includes various network interface circuitry, such as for example, a mobile network interface 126 through which the computing device can communicate with a cellular network, a Wi-Fi network interface 128 with which the computing device can communicate with a Wi-Fi base station 182, a BLUETOOTH network interface 130 with which the computing device can communicate with other BLUETOOTH devices (e.g., an external camera, microphone, or speakers), and/or an Ethernet connection or other wired connection that enables the computing device 102 to access network 150. The computing device 102 may include other sensors (not shown), such as, for example, an ambient light sensor, a temperature sensor, an accelerometer, etc.

An interactive streaming application 132 may be configured to enable a user of the computing device 102 to start a real-time video stream and share the real-time video stream via a live video sharing platform. A video stream is live or real-time when the source of the video stream is a video capture device rather than storage media. The interactive streaming application 132 may be a mobile application, or may be a web-based application. The interactive streaming application 132 may be configured to enable the user to select a privacy setting for the real-time video stream. The privacy setting controls the potential audience for the broadcast. A public broadcast is viewable by anyone using the social media platform. Public broadcasts are eligible for surfacing by anyone using the surfacing interface of the interactive streaming application 132 because anyone may join the broadcast. A private broadcast may be viewable only by those selected by the broadcaster. For example, the broadcaster may select some or all of those directly connected to the broadcaster in a connection graph (e.g., connection graph 142 or 168). As another example, the broadcaster may select those who the broadcaster is following who also follow the broadcaster in the connection graph. As another example, the interactive streaming application 132 may enable the broadcaster to select specific individuals (e.g., via a username, phone number, or other identifier) who are target viewers for a private broadcast. The viewers selected by the broadcaster may receive a message (e.g., push notification) about the live broadcast. In some implementations, for a private broadcast only those who receive the push message may view the broadcast. In other words, the target viewers cannot share the broadcast. In some implementations, social media users who are not invited to the broadcast may not be able to view the broadcast unless one of the target viewers sends an invitation to the broadcast, but the broadcaster may disable such sharing by target viewers.

The connection graph 142 may be a subset of the connection graph 162 that resides on server 160. A connection graph is a data structure representing relationships (i.e., connections) between one or more entities. For example, the connection graph 168 may be a data set that stores relationships between social media accounts. Relationships may include friending, following, linking, or some other relationship. An entity is directly connected to another entity in the connection graph when the two entities are connected by a path length of one, i.e., there are no intervening nodes.

After receiving a request from the user who wants to begin a broadcast, the interactive streaming application 132 may be configured to use various components of the computing device 102 or components in communication with computing device 102 to capture and send a real-time video stream and to display interactions (e.g., engagement representations) from viewers of the real-time video stream. For example, the interactive streaming application 132 may use the camera 116, the GPS 124, and the microphone 122 of the computing device 102 to capture a real-time video stream with audio. In some implementations, the GPS 124 may associate a location with the real-time video stream. The interactive streaming application 132 may include a transcoding engine 134, which may be configured to determine the throughput between the device 102 and the server 160 via networks 150. The throughput represents the bandwidth available to transmit the real-time video stream from device 102 to the server 160. When bandwidth is low the transcoding engine 134 is configured to reduce the video quality sent to the server 160. This differs from conventional streaming systems where the server 160 determines the video quality sent to each viewer based on the viewer's connection. In contrast, the interactive streaming application 132 decides the video quality for all viewers based on the bandwidth available to the broadcasting device 102. This ensures that latency is kept low, e.g., a few seconds or less. The low latency ensures that engagements are relevant to the broadcaster—in other words, the broadcaster receives almost real-time engagements. A latency more than a few seconds, and certainly a latency of 30 seconds or more would make engagements too old to provide effective communication between the broadcaster and the viewers.

The interactive streaming application 132 may also be configured to attach a timestamp packet to the frames of the real-time video stream provided from device 102 to the server 160. This special packet enables the server 160 associate an engagement with a particular time in the live feed broadcast. The interactive streaming application 132 may also be configured to use one of the computing components (e.g., network interface 128, mobile network interface 126, etc.) to provide the real-time video stream to a server, such as servers 160, 161. The interactive streaming application 132 may also be configured to receive engagement indications as well as metadata about the real-time video stream from the servers 160, 161. The engagement indications may be in a data stream that is associated with the video stream. The metadata may include information such as how many viewers have joined the real-time video stream and are currently viewing the video stream. The engagement indications may represent feedback and information from the viewers of the video stream. For example, the engagements may include comments, signals of appreciation, share notifications, viewer join notifications, etc. The interactive streaming application 132 may be configured to receive the data stream and to generate representations of the engagement indications in the data stream and provide the representations to the display 118.

For example, a signal of appreciation may be represented by an icon. The icon may be a heart shape, a star shape, a smiley face shape, or some other shape. The interactive streaming application 132 may be configured to add an icon to the display 118 during the real-time video stream for each signal of appreciation. Each signal of appreciation may be received from one of the viewers of the real-time video stream. A viewer may send a plurality of signals of appreciation during the real-time video stream, so that a viewer is not limited to signaling appreciation for the video stream once. Instead, the signals of appreciation may be associated with a particular moment of time in the real-time video stream and a viewer can send as many signals as desired. In some implementations, the icon representing a signal of appreciation may have a different appearance for each viewer.

The interactive streaming application 132 may be configured to trigger the display of the icons (e.g., representations of signals of appreciation) for a predetermined period of time. For example, each icon may appear on the display 118 of the computing device 102 for three or five seconds and then disappear or fade out. In some implementations, the interactive streaming application 132 may be configured to animate the icons on the display 118 while displayed. The interactive streaming application 132 may be configured to display and animate a plurality of the icons, each icon representing a single signal of appreciation. The icons may overlap with each other in the display.

The interactive streaming application 132 may also be configured to trigger the display of engagement notifications, such as comments from viewers, viewer join notices, and viewer share notifications. Like the icons, the engagement notifications may be associated with a moment in time (i.e., a timestamp) and displayed for a predetermined period of time after the moment in time, so that after the predetermined time the notification fades out, for example. The interactive streaming application 132 may scroll comments, so that older comments are moved up (or down or sideways) to make room for new engagement notifications. Thus, while a user of the computing device 102 is providing a real-time video stream, the user of the computing device 102 may also receive real-time feedback from the viewers of the real-time video stream.

The interactive streaming application 132 may be configured to provide the real-time video stream from a broadcasting computing device 102 to a server, such as servers 160, 161. The server 160 may be a single computing device, or may be a representation of two or more distributed computing communicatively connected to share workload and resources. In some implementations, the server 160 is a live video sharing platform server, which may be part of a social media platform. The server 160 may also include one or more processors 176 formed in a substrate configured to execute instructions. The instructions may be stored in memory, such as RAM, flash, cache, disk, tape, etc. In addition, the server 160 may include one or more data stores configured to store data in a persisting manner. For example, the server 160 may store a connection graph 168. The connection graph 168 may be a data structure representing relationships (i.e., connections) between one or more entities. For example, the connection graph 168 may be a data set that tracks relationships between social media accounts. Relationships can include friending, following, liking, linking, or some other relationship. In some implementations the connection graph 168 may represent entities that have installed an interactive streaming application 132 and set up a user account through the interactive streaming application.

In some implementations, the connection graph 168 may represent entities from more than one social media platform or entities that have installed various social media applications. Thus, the connection graph 168 may be understood to represent multiple distinct data sources, each representing a separate set of entities and relationships for separate social media platforms. In some implementations, a first user account in one data store may include an identifier for a second user account in a second data store, where the first user account and the second user account correspond to a single human user. Thus, the interactive video sharing engine 170 may be able to access the second data store via the link between the first user account and the second user account. The system may thus access a second social media platform via such connected accounts. The human user may have control over such connections.

The server 160 may also store broadcast metadata 166. Broadcast metadata 166 may store data, e.g., information and statistics, for real-time broadcasts and/or broadcasters. The data may include the engagements received during the live broadcast (and in some implementations, from replays of the stored broadcast), the total quantity of viewers, how long each viewer watched the real-time broadcast, classification data for portions of a broadcast, etc. The classification data may be generated by one or more classifiers 176, which may be a machine learning algorithm trained to classify a small portion of the video, e.g., a few seconds, into one or more classes. Examples of possible classes include, but are not limited to, Selfie, Noise, Computer Screen, Driving, Talk, Stage, Sports, Food, Outdoors, Animals, Unplugged, Art, etc. Classes may include sub-classes, such as Sports.Skiing, Sports.Baseball, Sports.Golf etc. In some implementations the classes may be hierarchical. In some implementations the classes may be domain specific. The classes can be manually curated but may be refined with the help of the system 100. In some implementations the small portion of the video may be segments generated as part of the live-streaming process, e.g., using the HTTP Live Stream Protocol (HLS) or similar process.

The server may also store stored video streams 164 for a limited time. For example, when a broadcaster completes a real-time broadcast, the broadcaster may choose to make the video stream available for replay. Accordingly, the server 160 may store the video stream in stored video streams 164. The stored video stream may include the engagement indications associated with the video stream.

The server may also include an interactive video sharing engine 170. The interactive video sharing engine 170 may service a live video sharing platform or other social media platform, and thus, have access to the connection graph 168 for the social media platform. The interactive video sharing engine 170 may include a video streaming engine 172 and a video discovery engine 174. The video streaming engine 172 may be configured to provide the transcoded video stream, including any added engagement indications, to client viewing devices (i.e., other instances of device 102) in a format appropriate for a particular client viewing device. The interactive video sharing engine 170 may be configured to receive the video stream from a broadcasting consumer device (e.g., smartphone or wearable computing device) and to provide it in a variety of different formats for playback on client viewing devices. Thus, the interactive video sharing engine 170 may convert the live video stream from the broadcaster into a plurality of formats and, when a viewing device joins the real-time video stream, the video streaming engine 172 may select, based on information about the viewing device, an appropriate format for the viewing device. The interactive video sharing engine 170 may be configured to receive engagements from the client viewing devices and provide engagement indications with the video stream provided to the various client devices. The interactive video sharing engine 170 may also provide the engagement indications to the broadcasting device. The engagement indicates may be associated with a particular time in the real-time video stream. For example, an engagement may be associated with the time represented by a timestamp packet associated with the video frame displayed when the engagement was received.

The interactive video sharing engine 170 may be configured to receive a request to start a real-time video stream from a broadcasting computing device 102. The request may include information from which the interactive video sharing engine 170 can determine target viewers. For example, the interactive video sharing engine 170 may use the connection graph 168 to determine user accounts directly related to the account for the broadcaster. These directly related user accounts may receive a message, for example a push notification, regarding the broadcast. In some implementations, only user accounts that have a "following" relationship with the account corresponding to the broadcaster may receive the message. When the broadcast information indicates the broadcast is private, the information may include identifiers (e.g. user account identifiers) for user accounts that can receive the message (e.g., push notification) about the live video stream. Thus, in some implementations, a private broadcast may be for a subset of the user accounts directly related to the broadcaster account in the connection graph 168 (e.g., followers), whereas a public broadcast can be joined by anyone, but only accounts directly related to the broadcaster are notified of the live video stream. Based on the information received with the real-time video stream and the connection graph 168, the interactive video sharing engine 170 may send messages to the targeted viewers. Once a targeted viewer chooses to join the real-time video stream, the video streaming engine 172 may provide the encoded real-time video stream to the viewer, e.g., via computing device 102 or 104.

The interactive video sharing engine 170 may be configured to receive engagements from viewers, associate an engagement with a moment of time, and provide engagement indications with the video-stream to client viewing devices and the broadcasting device. An engagement is some type of interaction from one of the viewers, such as a signal of appreciation, a comment provided by a viewer, or join/share notifications. The video streaming engine 172 may provide indications of the engagements with the video stream to encourage interaction among the viewers and broadcaster. In some implementations, the interactive video sharing engine 170 may aggregate the different types of engagements, generating statistics for the broadcast. For example, the interactive video sharing engine 170 may track the number of signals of appreciation received from all viewers per minute, track the total number of signals of appreciation, track the comments per minute, track the total number of comments, track the total number of viewers, track the average viewing time of the viewers, track the number of shares, etc. The statistics may be stored as broadcast metadata 166.

The interactive video sharing engine 170 may include video discovery engine 174. The video discovery engine 174 may enable the interactive video sharing engine 170 to suggest real-time video streams, stored video streams, e.g., in stored video streams 164, or pre-recorded video files to a viewer. In some implementations, the video discovery engine 174 may use the broadcast metadata 16 and the classifiers 176 to provide or suggest real-time video streams to a user. For example, the interactive video sharing engine 170 may classify portions, e.g., segments, of each live video stream as they are received from broadcasting devices, such as device 102. The portion may represent a few seconds of video frames from the video stream. The classifiers 176 may be machine learning algorithms trained to classify the portions. For example, the classifiers 176 may be a LSTM classifier that has undergone supervised or unsupervised training. In some implementations, the classifiers 176 may be one classifier able to classify a portion of a live video stream into one or several classes. In other implementations, the classifiers 176 may represent a group of classifiers, each classifier trained to classify a portion of a live stream video as either in or not in a specific class. In some implementations, the classifier may be trained to indicate whether the portion is interesting and, therefore, preview-eligible or not based on signals in metadata for previous broadcasts. In either case, the classifier 176 may provide a confidence score for each class provided by the classifier for a portion of the video stream, the confidence score representing how confident the model is that the portion of the video is correctly classified as in or not in the class. The classes and confidence scores may be stored for each portion of the video stream, e.g., as part of broadcast metadata 166. In some implementations, the classes and confidence scores may be deleted or disregarded after a determined amount of time so that portions of the video stream that are too old are no longer stored.

The video discovery engine 174 may use the classification data to determine whether a particular live video stream is eligible for preview. Public broadcasts are eligible for preview to any viewer, but a private broadcast is only eligible for preview to those viewers invited to the broadcast. In addition, the video discovery engine 174 may use class proportion data 162 to determine eligibility for preview. The class proportion data 162 identifies which classes are interesting or uncommon. The system 100 may prefer broadcasts that show interesting or uncommon content, as such content is more likely to be engaging to a wide variety of viewers. The class proportion data 162 may identify classes manually tagged as interesting, or in other words eligible for promotion. Any classes tagged as interesting may be preview eligible, or in other words eligible to be shown in a preview pane to potential viewers. Classes not manually tagged are not eligible and are repressed. In some implementations, the system may make a determination about whether a class is interesting or not based on a proportion associated with the class. The proportion represents how often live stream videos with a particular class appear in a representative sample of videos. For example, the system may select 1000 live stream videos as a sample and determine what percentage of the videos in the sample that are classified in a particular class. A lower percentage represents interesting or uncommon classes. Classes with a percentage that falls below a threshold (e.g., less than 1 percent or a half of a percent) may be considered interesting and eligible for preview. In some implementations, some classes, even if interesting, may not be eligible for preview, for example to prevent certain subject matter from being presented in the previews. For example, one class may represent live video streams that include pornographic content and live video streams classified as pornographic may never be preview eligible. The class proportion data 162 may be generated manually, automatically, or a combination of automatic and manual curation.

If one or more portions of a video stream are eligible for preview, the video discovery engine 174 may calculate an aggregated score for the video stream using the preview-eligible portions of the video stream. The aggregated score may be a combination of the confidence scores for each class that the video stream is a member of. For example, a live video stream that is classified as both sports and as animal may receive a higher aggregate score than a live video stream that is just sports or just animal. In some implementations, the video discovery engine 174 may aggregate the confidence score for each portion of the video stream. For example, if a video stream has 12 portions that are classified as sports, the aggregate score may represent an aggregate of the sports' confidence scores for the 12 portions. In some implementations, each portion may contribute equally to the aggregate score. For example, a live video stream with 12 portions classified as sports may have a score of 12. Accordingly, the aggregate score favors live video streams having more content classified as interesting, whether it is more portions or multiple preview-eligible classes. In some implementations, other metadata, e.g., in broadcast metadata 166, may be used to boost the aggregate score. For example, if the video broadcast has many current viewers or many engagements (e.g., engagements/second) the score may be boosted.

The video discovery engine 174 may generate an aggregate score for any video streams with preview-eligible portions and may rank preview eligible live video streams by the aggregate score. The video discovery engine 174 may also generate a preview for each preview eligible live video stream, or for a subset of the highest scoring live video streams. In some implementations, the preview may be based on the aggregate scores of preview eligible portions. For example, the video discovery engine 174 may select a portion that has a highest confidence for the class and make that portion the center of a preview by showing portions that precede and succeed the selected portion. Thus a selected portion that is three seconds long may be the center of a 15 second preview. In some implementations, the video discovery engine 174 may stitch together portions of the live video stream that have highest aggregate scores and/or confidence scores.

The video discovery engine 174 may also use parameters to determine which previews to display to a potential viewer. Some of the parameters may be user-based, e.g., personalized. For example, some viewers may have indicated a preference for sports videos and may have requested not to see animal videos. In this case, the video discovery engine 174 may evaluate the preview-eligible live video streams and eliminate those that fall into a class the user has requested not to see. Thus, the video discovery engine 174 prunes the preview-eligible live stream videos according to this personalized parameter. Some of the parameters may be location-based. For example, the viewer may have requested videos occurring in a specific geographic location. For example, a user may use the user interface 200 illustrated in FIG. 2 to select the nine live video streams originating in Brazil. The video discovery engine 174 may use the location information to prune any preview-eligible live video streams that are not associated with the selected location. The location is another example of a parameter. Some parameters may be query-based. For example, the potential viewer may use the search box 220 of FIG. 2 to enter a query and initiate a search using icon 215. The video discovery engine 174 may prune any preview-eligible live video streams that do not have a title or comments responsive to the query. Thus, query terms are another example of a parameter used to determine which previews to display.

Although described above as a live video stream search tool, the video discovery engine 174 may use similar techniques to search and surface recorded video streams, e.g., those stored in stored video streams 164. Such stored video streams can include pre-recorded videos that were never live-broadcasted. The video discovery engine 174 may interact with a user interface in the interactive streaming application 132 to receive input from the user and display results, e.g., a list of live or stored video streams, to the user. Thus, in some implementations, the interactive streaming application 132 may provide a user interface that enables a user of the computing device 102 to select a stored video stream for replay via the video discovery engine 174.

The interactive streaming application 132 of consumer computing device 102 may also be configured with a viewing user interface that enables a potential viewer to receive a notification about a live video stream, join the stream, and provide feedback in the form of comments or signals of appreciation, to invite others (when approved by the broadcaster), and to share via a live video sharing platform or other social media platform. The interactive streaming application 132 may also be configured to enable a user of the computing device 102 to update the connection graph (e.g., connection graph 162 and/or 142) to enable the user to receive notifications to join real-time broadcasts from a particular account (e.g., an account of the social media platform). For example, the interactive streaming application 132 may help a first user account follow or like a second user account, so that broadcast notifications from the second user account are presented to the first user.

The interactive streaming application 132 may be configured to display messages regarding live video streams. A live video stream is one that occurs in real-time, as the broadcaster captures the image. In other words, in a live or real-time video stream the source of the video stream is a video capture device (e.g., camera 116). In contrast the source of a replay of a video stream is storage media. If a user chooses to view the live video stream, the interactive streaming application 132 may display the real-time video stream on the display 118 of the viewer's computing device. The interactive streaming application 132 may also be configured to enable the user to provide engagements during the live video stream. For example, when a user provides an appreciation gesture, such as a tap on a touch screen display 118 or use of an input device, such as a mouse, to click in the display 118, while watching the live video stream, the interactive streaming application 132 may interpret the tap or click as a signal of appreciation. The interactive streaming application 132 may provide information about the signal of appreciation to the server 160. The information about the engagement may include an identifier for who provided the signal and when it was provided, for example by identifying the time in the timestamp packet associated with the frame being displayed when the engagement was received. At the server 160, a video streaming engine 172 may receive the engagements and may provide information about the engagements to the viewers and the broadcaster. This information may be used, at each client device 102, 104, to generate representations of the engagement, as described above. Thus, the video streaming engine 172 provides information to all participants participating in the real-time video stream about engagements from any of the viewers.

The interactive streaming application 132 may also enable a viewer to enter comments, which are provided to the interactive video sharing engine 170 at server 160. The interactive video sharing engine 170 may provide information about this engagement, such as the initials or username of the viewer providing the comment, as well as the content of the comment and a timestamp for the comment to viewing devices. In addition to comments, the interactive streaming application 132 may enable a viewer to invite others to view the live video stream. For example, anyone connected to the viewer via the connection graph 168 or 142 may receive a message with an invitation to join the live video stream. The interactive streaming application 132 may also enable a viewer to leave the broadcast or rejoin the broadcast at any time.

Figure 2:
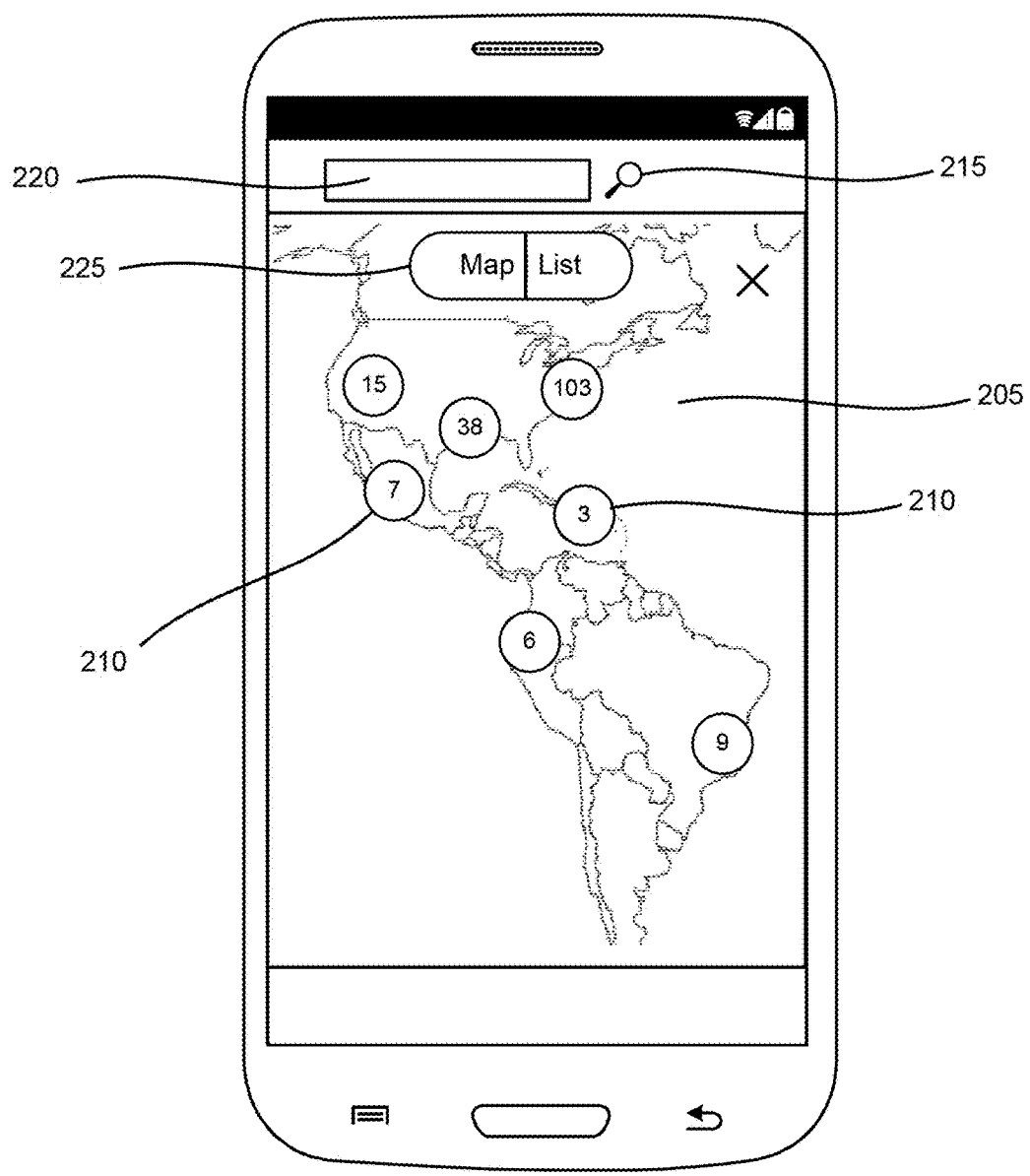
FIG. 2 is a schematic diagram illustrating a graphical user interface for surfacing live video streams, according to an implementation.

FIG. 2 is a schematic diagram illustrating a graphical user interface for surfacing live video streams, according to an implementation. In some implementations, the user interface 200 may be a map 205 that provides indications 210 of the location of video streams. In some implementations the indications 210 may represent all public live video streams. In some implementations, the indications 210 may represent only preview-eligible streams, i.e., those that are classified as interesting or uncommon or otherwise identified as eligible. The indications 210 may be placed proximate a location on the map that corresponds to the location of a video stream. The indications 210 may include a number representing the number of video streams with locations in the vicinity of the indication. Thus, the indication 210 that includes the number 103 may indicate that there are 103 video streams in locations on the east coast of the United States. The video streams may be live but can also include stored video streams, whether previously live or prerecorded. In some implementations, the user interface 200 may include an indication with a different appearance, e.g., a different color or shape, for stored video streams.

Figure 3:
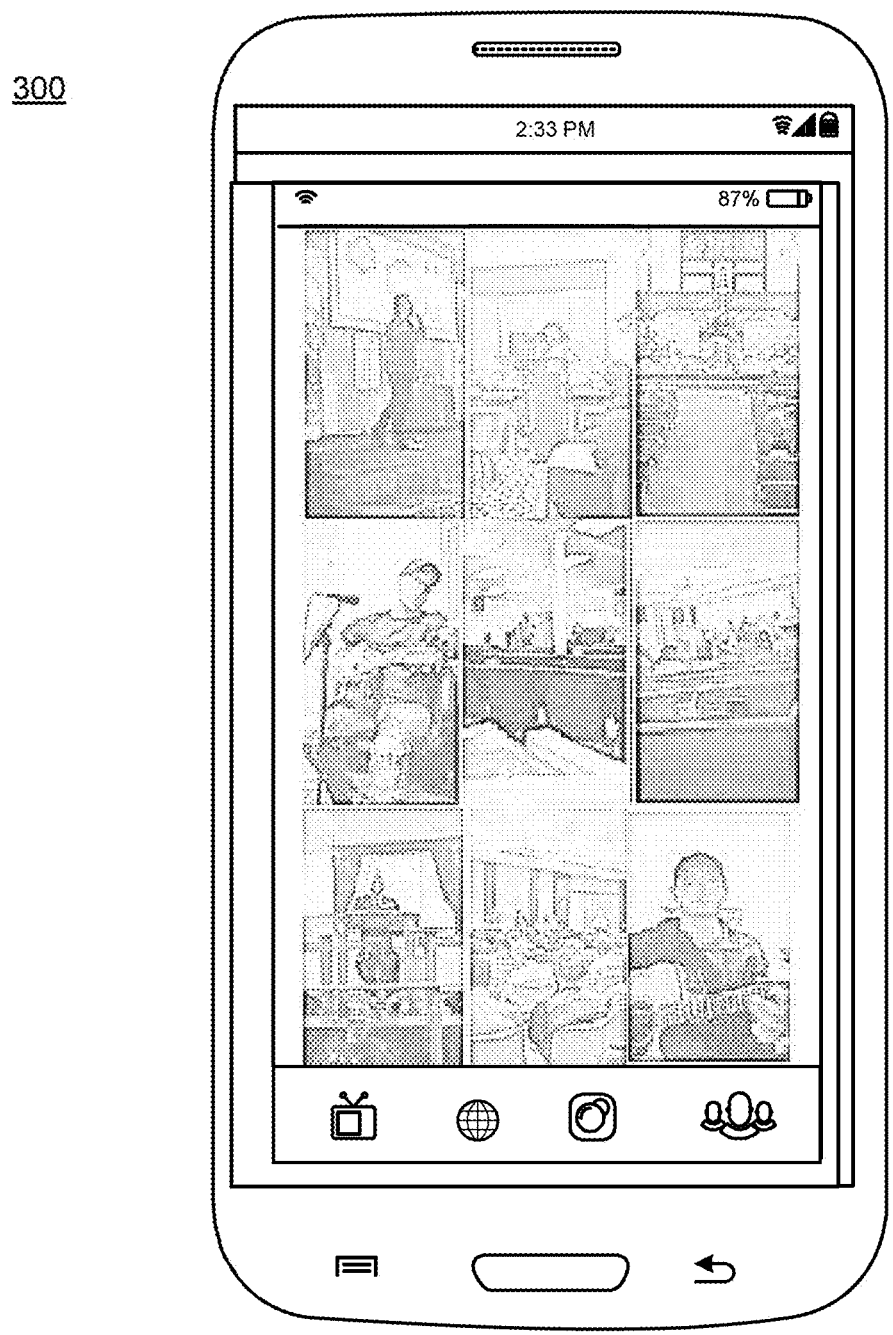
FIG. 3 is a schematic diagram illustrating a graphical user interface for surfacing live video streams, according to an implementation.
Figure 4:
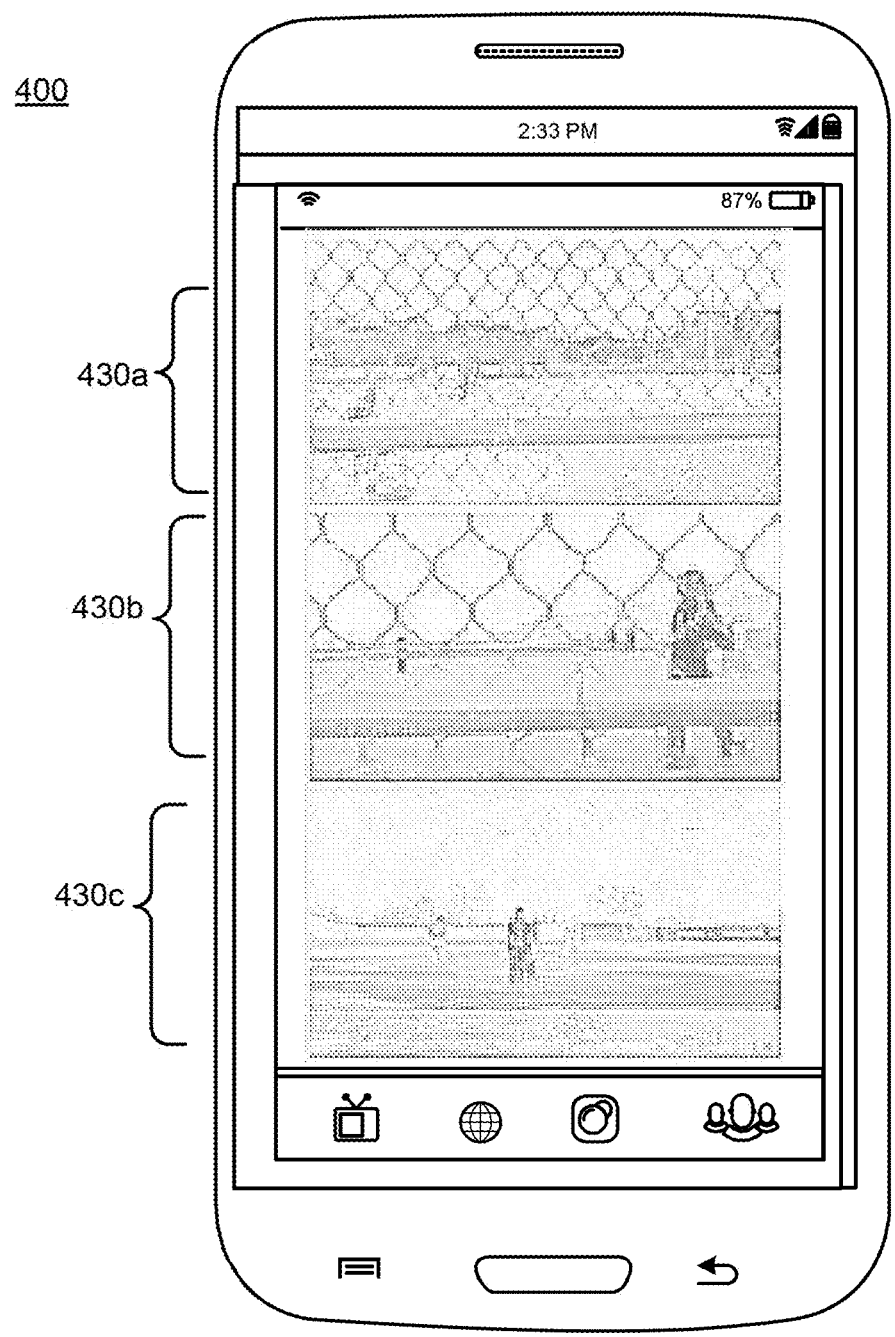
FIG. 4 is a schematic diagram illustrating a graphical user interface for surfacing live video streams using personalization, according to an implementation.
Figure 5:
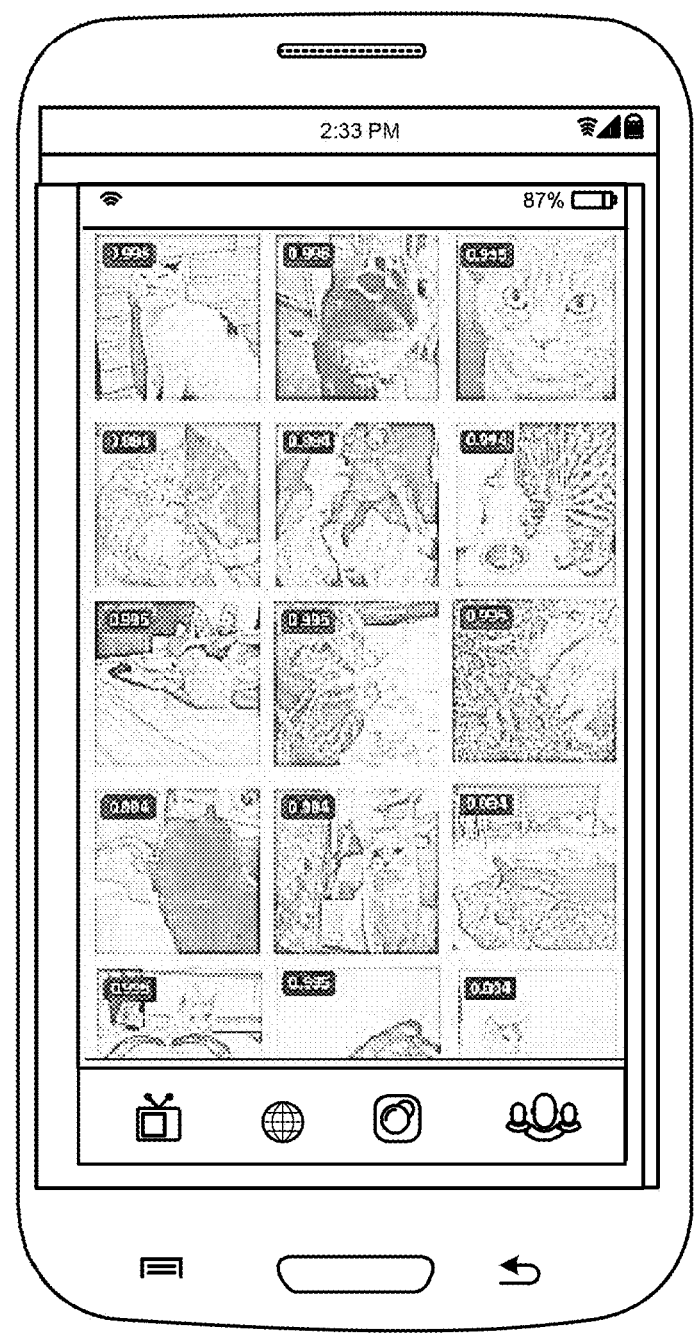
FIG. 5 is a schematic diagram illustrating a graphical user interface for surfacing live video streams using personalization, according to an implementation.

A user may pan the map to see different locations, or may zoom in or zoom out of the map. When the user zooms in, the user interface 200 may reorient the map and break down the video streams associated with the zoomed area. In other words, if the user zooms in on the east coast of the United States, the user interface 200 may display the states in on the east coast and provide indications 210 that break the 103 broadcasts into more indications so that, for example, the user could see that 25 of the 103 broadcasts are in the New York area, 17 are in the Washington DC area, etc. If a user selects an indication 210 the user interface may switch to a list view, as illustrated in FIG. 3, 4, or 5, that provides a preview of the video streams represented by the number. Put another way, if the user selects the indication 210 with 3 video streams in FIG. 2, the system may switch it a preview panel user interface (FIG. 3, FIG. 4, or FIG. 5) that has a short preview for each of the 3 video streams. The user interface may also include a control 225 to allow the user to manually switch to the preview panel, also referred to as a list view.

In some implementations, the user interface 200 may include a search control 215 that submits a query entered by the user in text input 220 to search for a particular broadcaster, a particular location, or a particular broadcast that has a title or content from comments that is responsive to the query. When the user enters a query in text input 220 and submits the query via control 215, the client device may provide the query to the server and the server may provide a list of matching preview-eligible broadcasts. The broadcasts may match based on terms, words, or topics in the class, in the title, in the comments, in the location name, or in a broadcaster's name. In response to a query, the client device may switch to a list user interface.

FIG. 3 is a schematic diagram illustrating a graphical user interface 300 for surfacing live video streams, according to an implementation. In the example of FIG. 3, the previews may be those that are most highly ranked based on the aggregate score for the live video streams. The user interface 300 may be scrollable, so that the user can scroll down or left to see previews for less highly ranked live video streams. The portion of the live video stream may be selected as described herein. In some implementations, the user interface 300 may display the portions of a plurality of live video streams in a matrix, e.g., in two or more rows and columns. In the example of FIG. 3 the matrix has three columns. The number of rows in the matrix may be dependent on the number of live video streams available for preview. In the example of FIG. 3, three rows are visible but additional rows may be displayed via scrolling. The user interface 300 is one example of a preview panel.

FIG. 4 is a schematic diagram illustrating a graphical user interface 400 for surfacing live video streams using personalization, according to an implementation. In the example of FIG. 4, the user may have selected sports as an interest, so the system may show only previews for live video streams that have been classified as sports. FIG. 5 is a schematic diagram illustrating another graphical user interface 500 for surfacing live video streams using personalization, according to an implementation. In the example of FIG. 5, the user may have entered a query for 'cats.' The previews illustrated in FIG. 5 may be responsive to the query because the term cat (or a synonym) is found in the title, the comments, or because the videos have been classified in a class associated with cats (e.g., Animals or Animals.Cats.). FIGS. 4 and 5 are also examples of a preview panel in a mobile environment. Implementations also include preview panels in a browser environment, which may include more viewing space and therefore more previews, as well as additional search/surfacing controls. In any of FIG. 3, 4, or 5, if the viewer clicks on a preview the viewer may join the broadcast.

Figure 6:
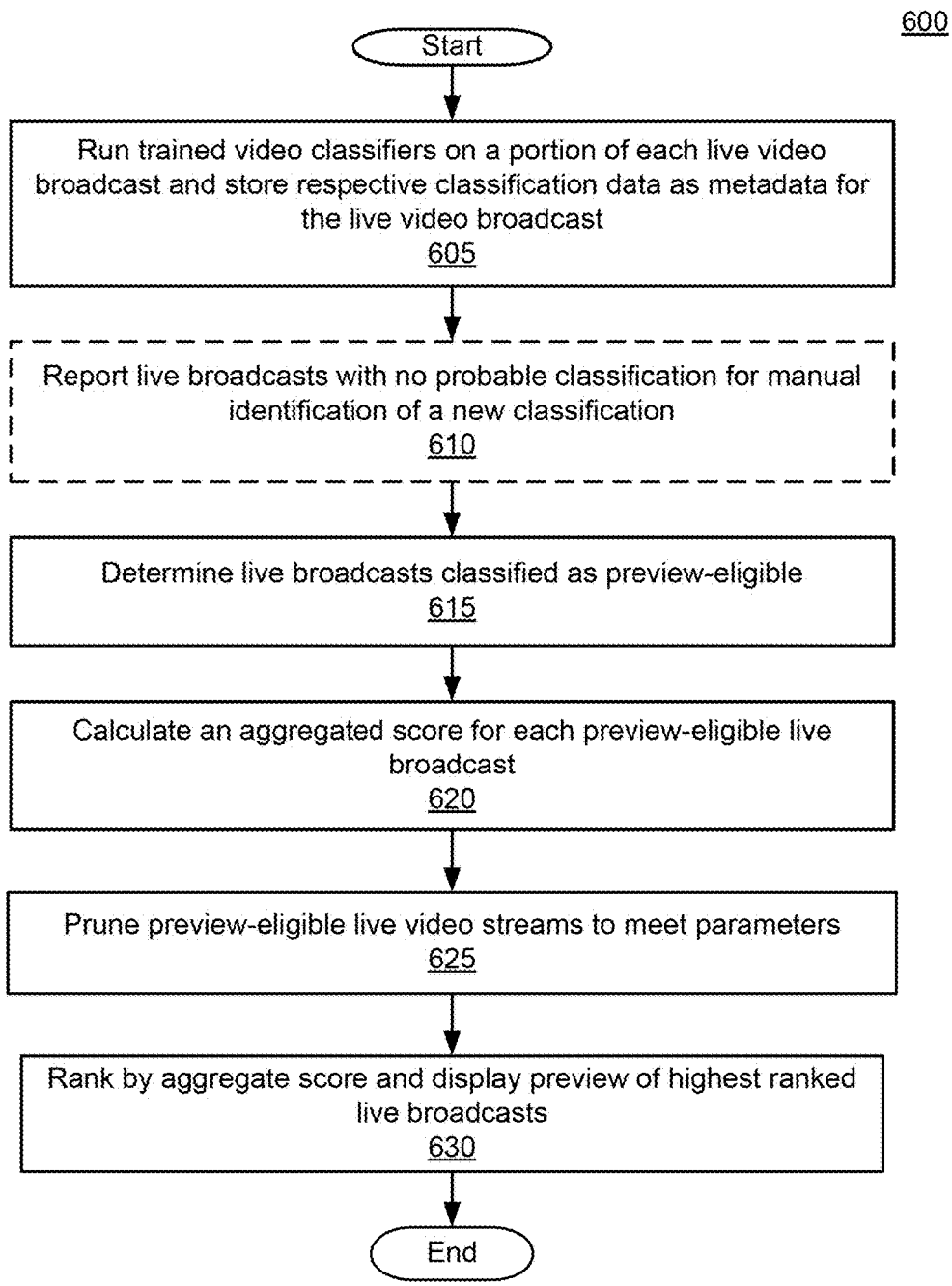
FIG. 6 is a flow chart illustrating a method of selecting live video broadcast for preview display, according to an implementation.

FIG. 6 is a flow chart illustrating a method 600 of selecting live video broadcast for preview display, according to an implementation. The process 600 may be executed by an interactive video sharing engine, such as engine 170 of FIG. 1. The process 600 may enable the system to select interesting/uncommon live video streams (or stored videos) for suggestion to a potential viewer. Process 600 may be customizable to the potential viewer through the use of parameters. The process 600 may be run continuously, so that all live video streams are continuously evaluated.

Process 600 begins with the system running trained video classifiers on a portion of each live video broadcast (605). The video classifiers may be supervised or unsupervised machine learning algorithms, such as LSTM classifiers. The system may store the classification data, i.e., which classes a portion of the live video stream falls into and what the confidence for the classification is, in metadata for the live video stream. This may allow the system to determine how much of a video stream is interesting (e.g., preview-eligible)

and to select an appropriate portion for generation of a preview. In some implementations, the system may report any live broadcasts that were not classified into any class (610). A system administrator may look at these broadcasts to determine if a new class is warranted, and to train the video classifiers to recognize the new class. Thus, the system may assist in identifying new and trending subject matter that has not yet been classified.

The system may determine which live broadcasts are classified as preview-eligible (615). A broadcast is preview eligible if the portion of the broadcast classified in step 605 is in a preview-eligible class. Classes may be tagged as preview-eligible (e.g., eligible to be shown in a surfacing user interface) in in a data structure, such as class proportion data 162. FIG. 8 is an example of class proportion data, according to an implementation. In FIG. 8, classes that are preview-eligible are tagged as "Show" and those that are not preview eligible are tagged as "Hide." The tags "Show" and "Hide" only refer to whether a class is considered interesting or uncommon and thus favored for display in a preview user interface. If a class is tagged as "Hide" it may still be found (e.g., via a query or location-based search) and joined, but may not receive preference in the preview user interface. An implementation of the generation of class proportion data is discussed in further detail with regard to FIG. 7.

The system may calculate an aggregated score for each preview-eligible live broadcast (620). The aggregated score favors broadcasts/videos that include more uncommon content, either because the broadcast includes many interesting/uncommon segments or because a particular segment is classified into several uncommon/interesting classes . The aggregated score may be a combination of the confidence scores for each class that the video stream is a member of. Thus, a live video stream that is classified as both outdoor and as food may receive a higher aggregate score than a live video stream that is just food or just outdoor. In some implementations, the system may aggregate the confidence score for each portion of the video stream. For example, if a video stream has 12 portions that are classified as sports, the aggregate score may represent an aggregate of the sports' confidence scores for the 12 portions. In some implementations, each portion may contribute equally to the aggregate score. For example, a live video stream with 12 portions classified as sports may have a score of 12. Accordingly, the system favors live video streams having more content classified as interesting. The system may use the aggregate score to rank live video streams to determine which live video streams appear in a position of prominence in a preview user interface. In some implementations, other metadata, e.g., in broadcast metadata 166, may be used to boost the aggregate score of a particular live video stream. For example, if the broadcast has many current viewers or has many engagements per second the aggregate score for broadcast may be boosted. Other signals may be used in calculating the aggregate score.

The system may prune the preview-eligible live video streams to meet parameters (625). The parameters may be personal or general. For example, a particular viewer may have expressed a dislike of animal video streams. Accordingly, although live video streams classified as "animals" may be considered interesting, and thus preview-eligible, such classified live video streams may be pruned for this particular viewer. As another example of a personal parameter, the view may have signaled a preference for videos in a certain location, having a word in a certain title, etc. The system may use these personal parameters to prune the preview-eligible live video streams. The parameters may also be general. A general parameter is a parameter not associated with a particular user. In some implementations, a general parameter may be related to a domain. For example, the system may have a channel that caters to animal videos. If the system is determining which live video streams to preview for the channel it may prune all preview-eligible live video streams that are not classified as animals. As another example of a general parameter, the preview user interface may display preview-eligible broadcasts taking place at a particular location. Accordingly, the system may prune preview-eligible live video streams that are not at the particular location. The system may use other similar parameters for pruning the preview-eligible live video streams.

The system may rank the live video streams left after pruning by the aggregate scores and display a preview of the highest ranked live video streams (630). In some implementations, the system may generate a preview of a particular live stream by determining which portions of the live stream are most highly rated (e.g., because the confidence of the classification is high, or because of engagements, or because of the number of viewers, or a combination of these) and may stitch together those portions for a short preview. The preview may be only a few seconds long. In some implementations, the preview may loop in the user interface. In some implementations, the system may determine the preview by selecting a highest ranked portion of the live video stream and making that portion the center of the preview. In this manner the system may show the most interesting part of a live video stream to the user, which assists the user in determining whether to join the video stream or not.

Figure 7:
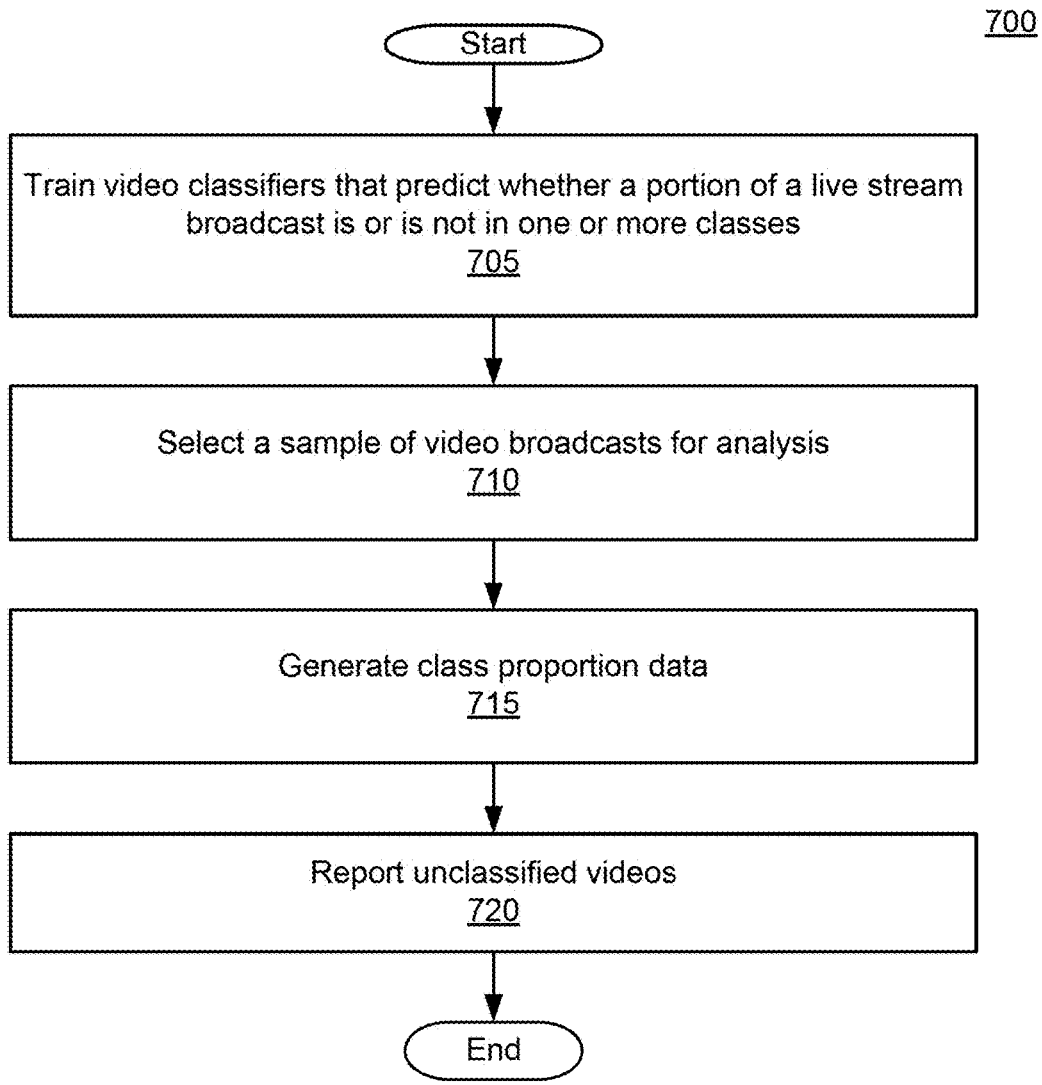
FIG. 7 is a flow chart illustrating a method of generating class proportion data used to determine classes eligible for preview, according to an implementation.

FIG. 7 is a flow chart illustrating a method 700 of generating class proportion data used to determine classes eligible for preview, according to an implementation. Process 700 may be executed by a live video streaming system, for example server 160 of FIG. 1. Process 700 may use trained classifiers to generate class proportion data, which can be curated by a system administrator. The system may use the class proportion data to determine which classifications are more rare, and therefore considered more interesting to potential viewers. Process 700 may be executed on a periodic basis to ensure that the proportions are correct and accurate, and to account for new classifications.

Process 700 begins with training video classifiers to predict whether a portion of a live stream (a broadcast) is or is not in one or more classes (705). The classifier may be a multi-way classifier that provides a confidence score for each of several classes or the classifier may be a set or collection of binary classifiers that each provide a confidence score for a particular class. The higher the confidence score, the more likely that the portion of the video stream is in the class. In some implementations, the video portions may be converted into a vector, e.g., a 12 dimensional vector and provided as input to a classifier. In some implementations, the training may be accomplished with any known or later discovered technique for supervised training. In some implementations, one or more of the classifiers may be trained to identify portions that are interesting/preview-eligible based on metadata for the portions in an unsupervised or semi-supervised manner. For example, the portions may be associated with one or more engagements and the system may store the engagements with the portion as described herein. The system may use segments with a high rate of engagements, e.g., the number of engagements per second, as positive training examples for the classifier. Portions with few engagements per second or no engagements per second may be provided to the classifier as negative training examples. Thus, using the metadata for a stored broadcast, the system may train a classifier in an unsupervised manner. Such a classifier may classify the portion as interesting or preview-eligible or not and the confidence score may represent how confident the classifier is that the portion is preview-eligible.

The system may select a sample of video broadcasts for analysis (710). The sample should be big enough to be statistically relevant to the corpus of live video broadcasts. The video broadcasts may be live or recorded for analysis purposes. The system may generate class proportion data using the videos in the sample (715). For example, the system may determine what percent of the sample each class represents. FIG. 8 illustrates example class proportion data generated in step 715. In the example of FIG. 8, the Selfie class represents more than 56% of the video streams, while the Sport class represents just 0.66%. In some implementations, the system may automatically tag classes with a low percentage as interesting, e.g. with a "Show" tag. In some implementations, the process 700 may include manual curation of the automatically tagged classes. For example, although the Children and Porn classes have a low percentage, a human curator may tag these classes as "Hide", which makes them not preview eligible in the preview user interface. In some implementations, the system may report any video streams in the sample that were not able to be classified. This may assist human curators in recognizing a possible new class that might be of interest.

Figure 9A:
FIG. 9A is an example of common or uninteresting live video streams not eligible for preview, according to an implementation.

FIG. 9A is an example of common or uninteresting live video streams not eligible for preview, according to an implementation. Most of the video previews of FIG. 9A are classified as Selfie or Noise.Dark, with a few classified as Screen These types of video streams may be considered not interesting to most viewers as these classifications appear often in the body of video streams (as shown by the class proportion data).

Figure 9B:
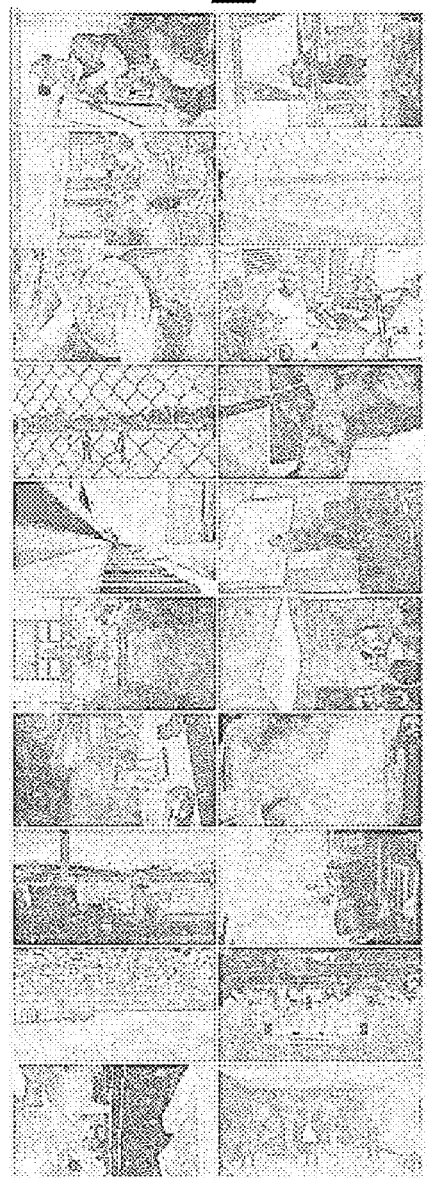
FIG. 9B is an example of uncommon or interesting live video streams eligible for preview, according to an implementation.

FIG. 9B is an example of uncommon or interesting live video streams eligible for preview, according to an implementation. The video previews illustrated in FIG. 9B illustrate video streams classified in more uncommon classes, such as Food, Outdoors, Sports, Unplugged, Talk, etc. The previews of FIG. 9B are more interesting to most users and offer a wider variety of scenery and topics than those of FIG. 9A. The video classification system described herein can surface the more interesting videos of FIG. 9B in a user interface, such as that illustrated in FIG. 3. In some implementations, the previews of FIG. 9A and 9B may be provided to a human curator to verify the classifier.

Figure 10:
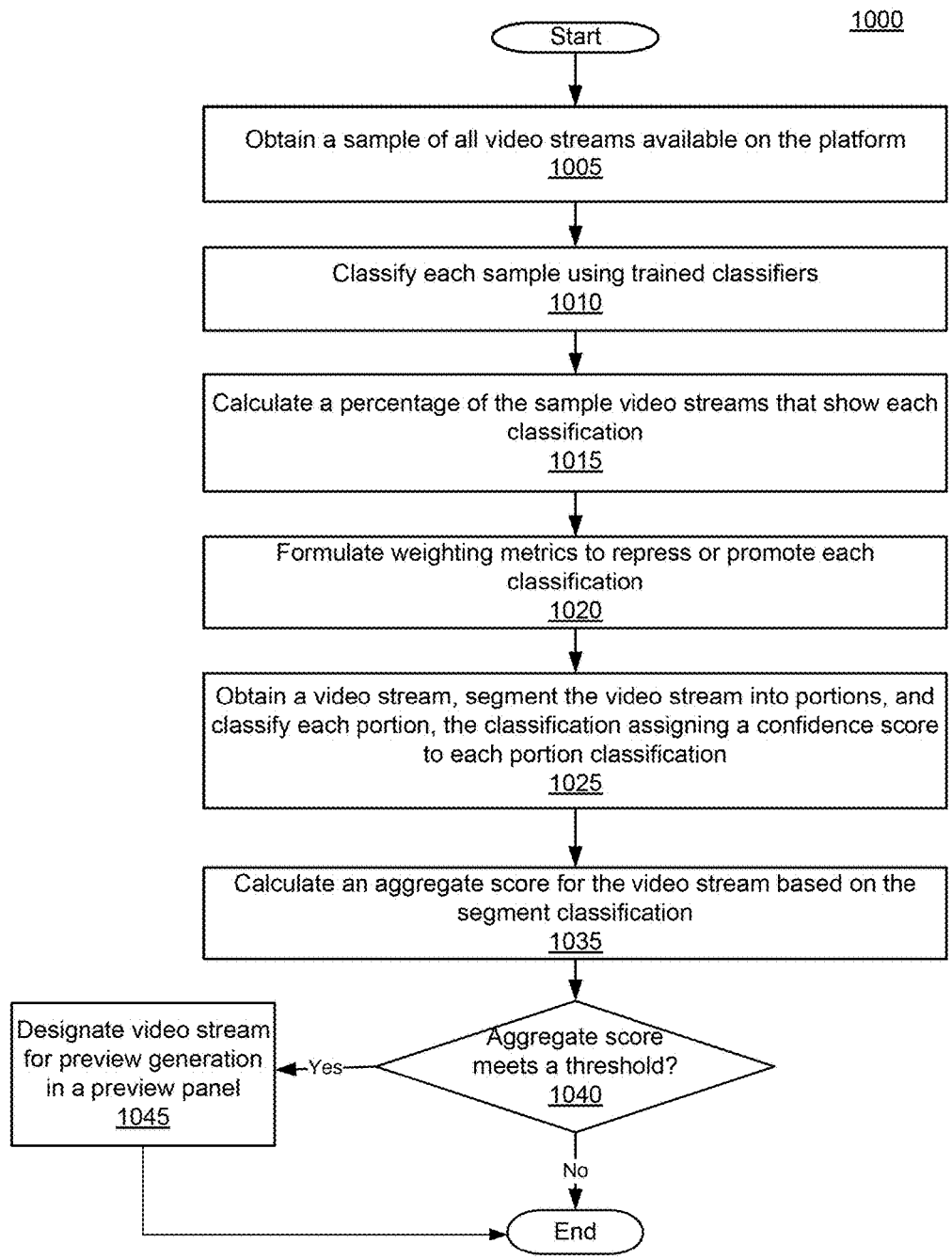
FIG. 10 is a flow chart illustrating an example method for classifying and selecting a video stream for generation of a preview, according to an implementation.

FIG. 10 is a flow chart illustrating an example method for classifying and selecting a video stream for generation of a preview, according to an implementation. The process 1000 may be executed by an interactive video sharing engine, such as engine 170 of FIG. 1. The process 1000 may begin with the system obtaining a sample of all video streams available on the platform (1005). The platform can be a social media platform or another platform that makes videos available for viewing. The system classifies the samples according to categories of content using trained classifiers (1010). In some implementations, the classifiers may be supervised models, e.g., machine learning models that are trained under some degree of human supervision. In some implementations, the classifier may be trained in an unsupervised manner using metadata (e.g., engagements per second, current viewers, etc.) for previous live video streams. Any particular video stream may include different content in different segments and hence may be classified under multiple classes. For example, a broadcast may include a sporting event and food available at the sport venue and hence would likely be classified as having content related to sports and also content related to food. The sample size selected from the platform should be sufficiently large to be representative of content shown in all accessible broadcasts at the time of sampling.

For the sample obtained, the system calculates a percentage of the sample video streams that show each classification or in other words class (1015). This enables the system to determine what content is popular among the broadcasts sampled and what content is rare. For a particular class (classification), the system determines number of broadcasts sampled that show content classified under the particular class. The system calculates the percentage of the sample broadcasts that show the particular class. This percentage is a proxy measure of the frequency of occurrence of the particular class over all accessible broadcasts. FIG. 8 shows an example of the classes and the respective percentages of their occurrence over the broadcasts sampled.

Based on the calculated popularity and rarity of classes (i.e., the class proportion data 162), the system formulates weighting metrics to either repress or promote each class (1020). For example, classes that are rare (e.g., occurring in less than 1% of the sample) may be weighted to promote the classification, where popular classes may be weighted to repress the class.

The system may obtain a video stream for which a snippet is to be generated and segment the video stream into portions, e.g., into 3 second segments (1025). The system may programmatically classify each segment using the classifiers. A video stream can have different segments classified differently. For example, a video stream may have 4 of its segments classified as Selfie, 8 as Indoor, 125 as Sport, and 150 as Food. The system assigns a measure of confidence in its classification of each segment.

Optionally, the system predicts a level of interest for the broadcast by calculating an aggregate score based on the above segment classification (1035). The aggregate score may be based on the number of segments for each class detected, the respective measures of confidence, the number of segments to repress or promote, etc., as well as the respective percentages of occurrence of detected content classes over the sampled broadcasts. The system may determine whether the aggregate score meets a threshold (1040). The threshold may be validated by training data and indicates the video stream has sufficient content of interest. If the video stream has a score that meets the threshold (1040, Yes), the system may designate the video stream for preview generation in a preview panel (1045) and generate the preview as described in FIG. 11. Process 1000 then ends. The system may perform steps 1025 to 1045 for all live video streams in a live video streaming platform in order to provide smart previews to a particular user. FIG. 9B illustrates video streams selected for smart preview, i.e., those that are rare and thus more interesting than those of FIG. 9A.

Figure 11:
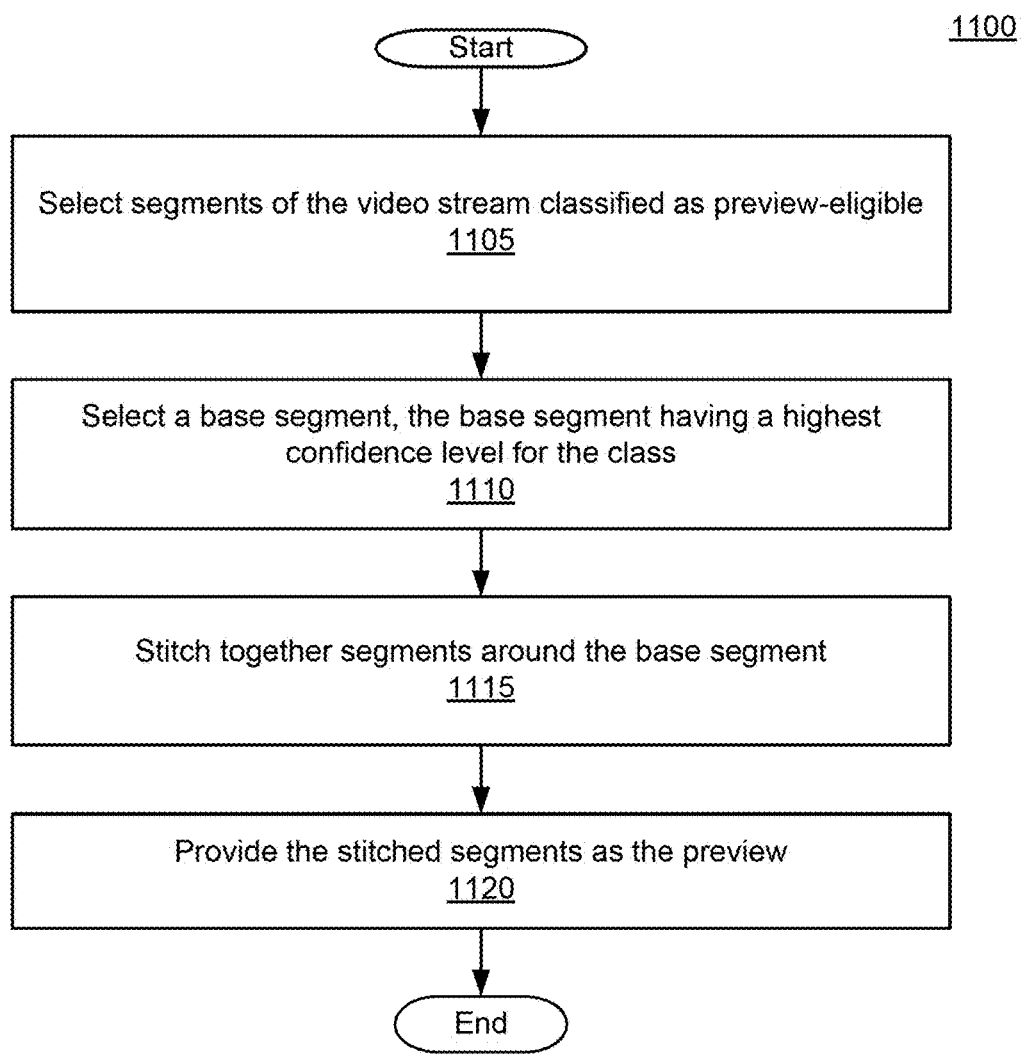
FIG. 11 is a flow chart illustrating an example method for generating a preview for a video stream, according to an implementation.

FIG. 11 is a flow chart illustrating an example method 1100 for generating a preview for a video stream, according to an implementation. The process 1100 may be executed by an interactive video sharing engine, such as engine 170 of FIG. 1. The process 1100 selects a best portion of the video stream to provide as a preview or snippet to help a potential viewer determine whether to view the video or join the live broadcast. The best portion may be determined based on the classification of that portion and, in some implementations, other signals. The process 1100 may be run for each video stream presented in a user interface (e.g., to join a live video stream or to select a recorded video for viewing).

Process 1100 begins by selecting the segments of the video stream classified as preview-eligible (1105). The preview-eligible segments are those that are classified in interesting or important classes, e.g., the classes tagged as "Show" rather than "Hide" in the class proportion data. The system selects a base segment from the segments classified as preview-eligible (1110). The base segment has a highest confidence level for the class, as assigned by the classifier. In some implementations, the base segment may have a class that matches a parameter, e.g., a class selected by the user or a class responsive to a query term. In other words, the base segment may have a lower confidence level than another segment, if the other segment is not classified in a class that matches the parameter. The system uses the base segment as a midpoint and stitches together segments around the base segment to form a snippet (1115). In some implementations, the segments stitched with the base segment are classified in the same class as the base segment. In some implementations, the segments stitched with the base segment have a confidence score for the class that meets a minimum threshold. In some implementations, the segments stitched with the base segment are those appearing subsequent to and just before the base segment. The system then provides the stitched segment as a preview for the video file. In this manner the system can select a best or most interesting and/or relevant portion of the video file to preview.

Figure 12:
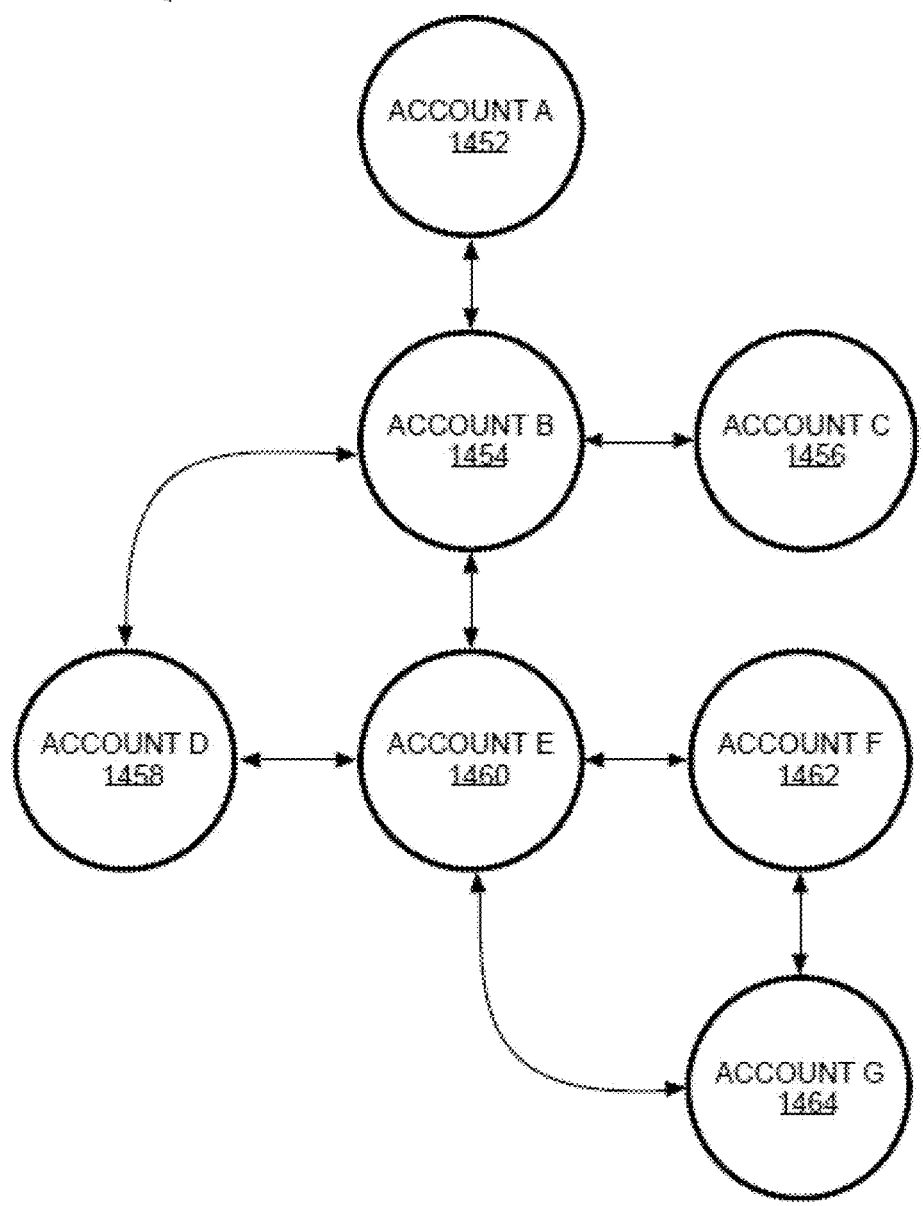
FIG. 12 is an example depiction of a connection graph, according to an implementation.

FIG. 12 shows an example depiction of a connection graph 1450 in accordance with one or more implementations of the invention. In one or more implementations, the connection graph 1450 is a depiction of connection graph 168 of FIG. 1, or connection graph 142 of FIG. 1. As shown in FIG. 12, the connection graph 1450 includes multiple components including nodes representing accounts of in a social media platform (i.e., Account A 1452, Account B 1454, Account C 1456, Account D 1458, Account E 1460, Account F 1462, and Account G 1464) and edges connecting the various nodes.

The connection graph 1450 is a data structure representing relationships (i.e., connections) between one or more accounts. The connection graph 1450 represents social media accounts as nodes and relationships as edges connecting one or more nodes. A relationship may refer to any association between the accounts (e.g., following, friending, subscribing, tracking, liking, tagging, and/or etc.). In some implementations, a relationship can be inferred. The edges of the connection graph 1450 may be directed and/or undirected based on the type of relationship (e.g., bidirectional, unidirectional), in accordance with various implementations of the invention.

Many live video sharing platforms or other social media platforms include functionality to broadcast streams of messages to one or more accounts based at least partially on a connection graph representing relationships between those accounts (see FIG. 12). A stream may be a grouping of messages associated with one or more accounts or can reflect any arbitrary organization of messages that is advantageous for the user of an account. In accordance with various implementations of the invention, a "message" is a container for content broadcasted/posted by or engaged by an account of a messaging platform. Messages can be authored by users and can include any number of content types (multimedia, text, photos, and video content, including a single video content file that includes a plurality of different video content segments, etc.).

Figure 13:
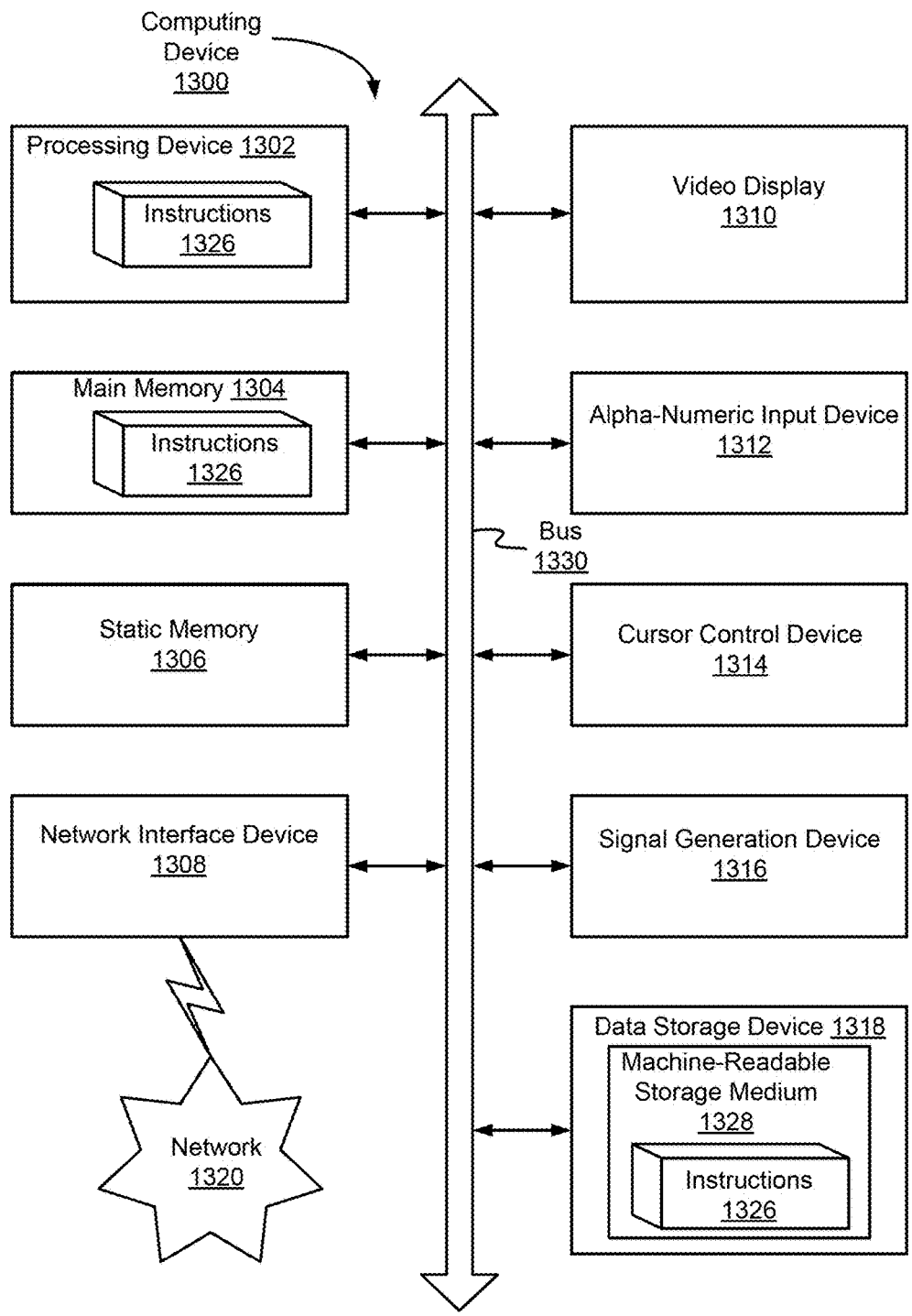
FIG. 13 shows an example of a computer device and a mobile computer device that can be used to implement the techniques described here.

FIG. 13 illustrates a diagrammatic representation of a machine in the example form of a computing device 1300 within which a set of instructions, for causing the machine to perform any one or more of the methodologies discussed herein, may be executed. The computing device 1300 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 1300 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 1300 includes a processing device (e.g., a processor) 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)) and a data storage device 1318, which communicate with each other via a bus 1330.

Processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. The processing device 1302 is configured to execute instructions 1326 (e.g., instructions for an application ranking system) for performing the operations and steps discussed herein.

The computing device 1300 may further include a network interface device 1308 which may communicate with a network 1320. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse) and a signal generation device 1316 (e.g., a speaker). In one implementation, the video display unit 1310, the alphanumeric input device 1312, and the cursor control device 1314 may be combined into a single component or device (e.g., an LCD touch screen).

The data storage device 1318 may include a computer-readable storage medium 1328 on which is stored one or more sets of instructions 1326 (e.g., instructions for the application ranking system) embodying any one or more of the methodologies or functions described herein. The instructions 1326 may also reside, completely or at least partially, within the main memory 1304 and/or within the processing device 1302 during execution thereof by the computing device 1300, the main memory 1304 and the processing device 1302 also constituting computer-readable media. The instructions may further be transmitted or received over a network 1320 via the network interface device 1308.

While the computer-readable storage medium 1328 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

According to one aspect, a method includes obtaining a portion of a live video stream available for viewing via a live video sharing platform, assigning the portion to a class, determining, based on a tag for the class, whether the portion is preview-eligible, and generating, responsive to determining the portion is preview-eligible, a snippet of the live video stream using the portion.

These and other aspects can include one or more of the following features. For example, generating the snippet may include providing one or more portions that precede the portion and one or more portions that succeed the portion as the snippet, so that the portion is a middle portion of the snippet. As another example, generating the snippet may include stringing the portion with one or more other portions of the live video stream that are determined to be preview-eligible. As another example, the method may also include obtaining a plurality of portions of the live video stream, the portion being one of the plurality of portions, determining a class assignment for each of the plurality of portions, the class assignment including a corresponding confidence score, and selecting the portion from among the plurality of portions responsive to determining that the portion has a highest confidence score from among the plurality of portions. In some implementations, the portion has at least two class assignments and at least two corresponding confidence scores, wherein the corresponding scores are aggregated to select the portion. As another example, the method may also include obtaining a plurality of portions of the live video stream, the portion being one of the plurality of portions, determining a class assignment for each of the plurality of portions, the class assignment including a corresponding confidence score, calculating an aggregate score for the live video stream, the aggregate score being calculated from the confidence scores for each of the plurality of portions, and selecting the portion from among the plurality of portions responsive to determining that the portion has a highest aggregate score.

According to one aspect, a method includes determining, using a trained video classifier, a set of live broadcasts that have at least one portion that is classified as preview-eligible, calculating, for each of the live broadcasts in the set, an aggregate score for the live broadcast, selecting live broadcasts with highest aggregate scores, generating a snippet for each of the selected live broadcasts, and providing the snippets in a user interface.

These and other aspects can include one or more of the following features. For example, each portion that is classified as preview-eligible may have an associated confidence score for the classification and calculating the aggregate score for a live broadcast includes determining a quantity of the portions that are classified in the same class and aggregating the confidence scores for the portions classified in the same class. As another example, each portion that is classified as preview-eligible has an associated confidence score for the classification calculating the aggregate score for a live broadcast includes determining at least one portion that is classified in two distinct classes that are each preview-eligible and aggregating the confidence scores for the two distinct classes. As another example, a first live broadcast with portions classified in two distinct classes may have a higher aggregate score than a second live broadcast with portions classified in a single class. As another example, calculating the aggregate score for a live broadcast may include boosting the aggregate score based on the number of current viewers of the live broadcast. As another example, calculating the aggregate score for a live broadcast includes boosting the aggregate score based on a number of engagements received for the live broadcast. As another example, generating the preview for a live broadcast can include stitching together a number of portions classified as preview-eligible and/or selecting a first portion of the live broadcast that is preview-eligible, obtaining preceding portions and succeeding portions of the first portion, and stitching the preceding portions to the first portion and stitching the succeeding portions to the first portion, so the first portion represents a middle of the snippet.

According to one aspect, a method includes selecting, responsive to receipt of a request that includes a user-provided parameter, portions of live video streams that are responsive to the parameter, determining, for each selected portion, a subset of portions that are preview-eligible, generating a snippet for each live video stream that has a portion in the subset, and providing the snippets as a search result for the request.

These and other aspects can include one or more of the following features. For example, the user-provided parameter may be a search term and selecting the portions can include selecting portions from live video streams with a title responsive to the search term and/or selecting portions from live video streams with a description or engagements responsive to the search term. As another example, where the user-provided parameter is a class and selecting the portions may include selecting portions from live video streams that are assigned to the class. As another example, determining the subset may include determining, using a trained video classifier, a respective class for at least some portions of each of live broadcasts, and determining, for each portion, whether the respective class is classified as a promoted class, and selecting portions for the subset that have a respective class classified as a promoted class. In some implementations, determining whether a respective class is classified as a promoted class can include determining a percentage of live broadcasts in a sample of live broadcasts that include portions classified in the respective class and determining the respective class is classified as a promoted class responsive to determining the percentage fails to meet a threshold. Determining whether a respective class is classified as a promoted class may also include determining a percentage of live broadcasts in a sample of live broadcasts that include portions classified in the respective class and determining the respective class is classified as a promoted class responsive to determining the percentage is less than one percent.

According to one aspect, a system includes at least one processor; a display, and memory storing instructions that, when executed by the at least one processor, cause the system to perform operations representing any of the methods or processed disclosed herein.

According to one aspect, a system includes at least one processor and a non-transitory computer-readable medium having executable instructions stored thereon that, when executed by the at least one processor, are configured to perform any of the methods disclosed herein.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A computing device comprising:
   at least one processor; and
   a non-transitory computer-readable medium having executable instructions stored thereon that, when executed by the at least one processor, are configured to:
   for each of a plurality of live video streams available for viewing via a live video sharing platform:
   obtain a portion of the live video stream, the portion being a segment generated by a streaming protocol,
   assign the portion to a class using a video classifier, each class used in the video classifier having an associated tag indicating whether the class is preview-eligible or not preview-eligible, wherein a class with a preview-eligible tag has an associated percentage that represents rare occurrence within a statistically relevant sample of segments of live video streams, the percentage representing a quantity of segments in the sample that are classified into the class compared with a total quantity of segments in the sample, determine, based on the tag for the class, whether the portion is preview-eligible, and generate, responsive to determining that the portion is preview-eligible, a snippet of the live video stream using the portion, and provide at least some of the snippets for display in a user interface, the snippets provided for display in the user interface being selectable and the user interface being configured to, responsive to a user selecting a first snippet of the snippets provided for display in the user interface, enable the user to join the live video stream corresponding to the first snippet.

2. The computing device of claim 1, wherein generating the snippet includes:

providing one or more portions that precede the portion and one or more portions that succeed the portion as the snippet, so that the portion is a middle portion of the snippet.

3. The computing device of claim 1, wherein generating the snippet includes:

including the portion with one or more other portions of the live video stream that are determined to be preview-eligible.

4. The computing device of claim 1, wherein the computer-readable medium also includes instructions stored thereon that, when executed by the at least one processor, are configured to:

obtain a plurality of portions of the live video stream, the portion being one of the plurality of portions;

determine a class assignment for each of the plurality of portions, the class assignment for a particular portion in the plurality of portions including a confidence score; and select the portion from among the plurality of portions responsive to determining that the portion has a highest confidence score from among the plurality of portions.

5. The computing device of claim 4, wherein the portion has at least two class assignments and at least two corresponding confidence scores, wherein the corresponding confidence scores are aggregated to select the portion.

6. The computing device of claim 1, wherein the computer-readable medium also includes instructions stored thereon that, when executed by the at least one processor, are configured to:

obtain a plurality of portions of the live video stream, the portion being one of the plurality of portions;

determine a class assignment for each of the plurality of portions, the class assignment including a respective confidence score;

calculate an aggregate score for the live video stream, the aggregate score being calculated from the respective confidence score for each of the plurality of portions; and select the portion from among the plurality of portions responsive to determining that the portion has a highest aggregate score.

7. The computing device of claim 1, wherein the computer-readable medium also includes instructions stored thereon that, when executed by the at least one processor, are configured to:

calculate, responsive to determining the portion is preview-eligible, an aggregate score for the live video stream, wherein the aggregate score is used to determine the at least some of the snippets for display in the user interface.

8. The computing device of claim 1, wherein a percentage that represents rare occurrence is 2% or less.

9. A method comprising:

determining, using a trained video classifier, a set of live broadcasts that have at least one portion that is classified in a class identified as preview-eligible, the at least one portion being a segment generated by a streaming protocol, wherein a class with a preview-eligible tag has an associated percentage that represents rare occurrence within a statistically relevant sample of segments of live broadcasts, the percentage representing a quantity of segments in the sample that are classified into the class compared with a total quantity of segments in the sample;

calculating, for each of the live broadcasts in the set, an aggregate score for the live broadcast based on confidence scores for portions of the live broadcast classified in a class identified as preview-eligible;

selecting live broadcasts with highest aggregate scores;

generating a snippet for each of the selected live broadcasts; and providing the snippets for display in a user interface, the snippets provided for display in the user interface being selectable and selection of a first snippet of the snippets in the user interface enables a user to join the live broadcast for which the first snippet was generated.

10. The method of claim 9, wherein each portion that is classified as preview-eligible has an associated confidence score for the classification and calculating the aggregate score for a live broadcast includes:

determining a quantity of the portions that are classified in the same class; and aggregating the confidence scores for the portions classified in the same class.

11. The method of claim 9, wherein each portion that is classified as preview-eligible has an associated confidence score for the classification calculating the aggregate score for a live broadcast includes:

determining at least one portion that is classified in two distinct classes that are each preview-eligible; and aggregating the confidence scores for the two distinct classes.

12. The method of claim 9, wherein a first live broadcast with portions classified in two distinct classes has a higher aggregate score than a second live broadcast with portions classified in a single class.

13. The method of claim 9, wherein calculating the aggregate score for a live broadcast includes boosting the aggregate score based on the number of current viewers of the live broadcast.

14. The method of claim 9, wherein calculating the aggregate score for a live broadcast includes boosting the aggregate score based on a number of engagements received for the live broadcast.

15. The method of claim 9, wherein generating the preview for a live broadcast includes:

stitching together a number of portions classified as preview-eligible.

16. The method of claim 9, wherein generating the preview for a live broadcast includes:
   selecting a first portion of the live broadcast that is preview-eligible;
   obtaining preceding portions and succeeding portions of the first portion; and
   stitching the preceding portions to the first portion and stitching the succeeding portions to the first portion, so the first portion represents a middle of the snippet.

17. The method of claim 9, further comprising:
   receiving a query term from a user; and
   determining a sub-set of the set of live broadcasts responsive to the query term, each of the live broadcasts in the sub-set having associated text responsive to the query term,
   wherein the snippets provided for display in the user interface are selected from live broadcasts in the sub-set.

18. The method of claim 17, wherein the associated text of a live video stream includes a title of the live video stream.

19. The method of claim 17, wherein the associated text of a live video stream includes engagements for the live video stream.

20. The method of claim 9, further comprising:
   receiving a query term from a user; and
   determining a sub-set of the set of live broadcasts responsive to the query term, each of the live broadcasts in the sub-set having at least one portion that is classified in a class that is responsive to the query term,
   wherein the snippets provided for display in the user interface are selected from live broadcasts in the sub-set.

* * * * *